(12) United States Patent
Kriss

(10) Patent No.: US 12,174,043 B2
(45) Date of Patent: *Dec. 24, 2024

(54) MONITORING AND PREDICTING FAILURES OF SPECIALTY EQUIPMENT INCLUDING LIQUID GAS STORAGE SYSTEMS

(71) Applicant: KLATU NETWORKS, INC., Poulsbo, WA (US)

(72) Inventor: Richard Kriss, Poulsbo, WA (US)

(73) Assignee: KLATU Networks, Inc., Poulsbo, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,682

(22) Filed: Jul. 24, 2023

(65) Prior Publication Data

US 2024/0118108 A1     Apr. 11, 2024

Related U.S. Application Data

(63) Continuation of application No. 16/215,545, filed on Dec. 10, 2018, now Pat. No. 11,709,075.

(Continued)

(51) Int. Cl.
*G01D 4/00*     (2006.01)
*F25B 1/00*     (2006.01)
(Continued)

(52) U.S. Cl.
CPC .............. *G01D 4/00* (2013.01); *F25B 1/00* (2013.01); *G06Q 10/06314* (2013.01); *G06Q 10/08* (2013.01); *G06Q 10/087* (2013.01)

(58) Field of Classification Search
CPC ...... G01D 4/00; F25B 1/00; G06Q 10/06314; G06Q 10/08; G06Q 10/087
See application file for complete search history.

(56) References Cited

U.S. PATENT DOCUMENTS 5,317,903 A    6/1994  McClelland et al.
5,983,198 A   11/1999  Mowery et al.
(Continued)

FOREIGN PATENT DOCUMENTS

CN    107258397 A    10/2017
EP      1731857 A1   12/2006
(Continued)

OTHER PUBLICATIONS

Fantucci, Stefano et al. "Thermal energy storage with super insulating materials: a parametrical analysis", ScienceDirect, Energy Procedia 78, (2015) pp. 441-446.
(Continued)

*Primary Examiner* — Dylan C White
(74) *Attorney, Agent, or Firm* — LOZA & LOZA, LLP; Anthony Smyth

(57) ABSTRACT

A method and an apparatus and a computer program product are provided that can monitor thermal mass or thermal energy sources available at remotely-located equipment using wired or wirelessly connected sensors. The method may include to receiving measurements captured by one or more sensors coupled to the equipment, the measurements including measurements indicating remaining quantities of thermal mass or thermal energy sources available for use by the equipment, monitoring replenishment events in which the thermal mass or thermal energy sources are resupplied, generating a thermal efficiency and usage or characteristic describing thermal efficiency and a cycle of usage of the thermal mass or thermal energy sources based on historical measurements of thermal efficiency and quantities of thermal mass or thermal energy sources consumed and stored by the equipment and a history of replenishment events, and scheduling one or more replenishment events based on the usage characteristic.

20 Claims, 13 Drawing Sheets

Related U.S. Application Data

(60) Provisional application No. 62/596,746, filed on Dec. 8, 2017, provisional application No. 62/607,313, filed on Dec. 18, 2017.

(51) Int. Cl.
  *G06Q 10/0631* (2023.01)
  *G06Q 10/08* (2024.01)
  *G06Q 10/087* (2023.01)

(56) References Cited

U.S. PATENT DOCUMENTS

| | | | |
|---|---|---|---|
| 6,064,311 | A | 5/2000 | Ferenczi et al. |
| 6,336,362 | B1 | 1/2002 | Duenas |
| 6,668,665 | B2 | 12/2003 | Schimnowski et al. |
| 6,700,503 | B2 | 3/2004 | Masar et al. |
| 7,304,588 | B2 | 12/2007 | Ingalsbe et al. |
| 8,079,245 | B1 | 12/2011 | Owens et al. |
| 8,249,829 | B2 | 8/2012 | Vass et al. |
| 8,803,683 | B2 | 8/2014 | Schnitz et al. |
| 9,429,459 | B2 | 8/2016 | Marcos Montes et al. |
| 9,934,521 | B2 | 4/2018 | Baratz |
| 10,337,964 | B2 | 7/2019 | Kriss |
| 11,060,763 | B2 * | 7/2021 | Van Houten .......... F24H 15/238 |
| 11,709,075 | B2 * | 7/2023 | Kriss .................. F25B 1/00 705/7.24 |
| 2004/0204870 | A1 | 10/2004 | Schimnowski et al. |
| 2005/0056090 | A1 | 3/2005 | McSheffrey et al. |
| 2005/0247070 | A1 | 11/2005 | Arshansky et al. |
| 2005/0268647 | A1 | 12/2005 | Finamore |
| 2006/0015543 | A1 | 1/2006 | Humphrey |
| 2006/0111040 | A1 | 5/2006 | Jenkins et al. |
| 2006/0117766 | A1 | 6/2006 | Singh et al. |
| 2006/0167660 | A1 | 7/2006 | Hatch |
| 2006/0243347 | A1 | 11/2006 | Humphrey |
| 2010/0299105 | A1 | 11/2010 | Vass et al. |
| 2011/0036104 | A1 | 7/2011 | Toyoshima et al. |
| 2011/0252883 | A1 | 10/2011 | Dietz et al. |
| 2012/0185197 | A1 | 7/2012 | Lorden et al. |
| 2012/0191257 | A1 | 7/2012 | Corcoran et al. |
| 2013/0002443 | A1 | 1/2013 | Breed et al. |
| 2013/0041795 | A1 | 2/2013 | Baratz |
| 2013/0245991 | A1 | 9/2013 | Kriss |
| 2014/0166232 | A1 | 6/2014 | Al-Hallaj et al. |
| 2015/0287313 | A1 | 10/2015 | Silvers |
| 2015/0345436 | A1 | 12/2015 | Yang et al. |
| 2016/0292632 | A1 | 10/2016 | Mashburn et al. |
| 2017/0307141 | A1 | 10/2017 | Essey |
| 2018/0349980 | A1 | 12/2018 | Alvo et al. |
| 2019/0178680 | A1 | 6/2019 | Kriss |
| 2020/0265528 | A1 | 8/2020 | Sugie et al. |
| 2020/0342391 | A1 * | 10/2020 | Mashburn .......... G06Q 30/0635 |
| 2023/0244195 | A1 * | 8/2023 | Subbloie .............. H02H 1/0007 700/47 |

FOREIGN PATENT DOCUMENTS

| | | |
|---|---|---|
| EP | 1942306 A1 | 7/2008 |
| EP | 1942306 B1 | 5/2019 |
| JP | H10103820 A | 4/1998 |
| KR | 20150034484 A | 4/2015 |

OTHER PUBLICATIONS

EP Serial No. 18886426.8. Examination Report (May 6, 2022).
European Appln. Ser. No. 18886426.8. Extended Search Report (Jun. 14, 2021).
European Appln. Ser. No. 18886426.8. Search Report (May 13, 2024).

* cited by examiner

MONITORING AND PREDICTING FAILURES OF SPECIALTY EQUIPMENT INCLUDING LIQUID GAS STORAGE SYSTEMS

PRIORITY CLAIM

This application is a continuation of U.S. claims priority to and the benefit of U.S. patent application Ser. No. 16/215,545 filed in the United States Patent Office on Dec. 10, 2018, which claims priority to and the benefit of U.S. Provisional Patent Application Ser. No. 62/596,746 filed in the U.S. Patent Office on Dec. 8, 2017, and of U.S. Provisional Patent Application Ser. No. 62/607,313 filed in the U.S. Patent Office on Dec. 18, 2017, the entire content of these applications being incorporated herein by reference as if fully set forth below in its entirety and for all applicable purposes.

TECHNICAL FIELD

The present invention relates generally to the monitoring of storage systems, and more particularly to monitoring the status, condition and environmental trends affecting the performance of temperature-controlled storage and shipping systems and equipment associated with their support and operation.

BACKGROUND

In many industries, specialized equipment is used to store temperature sensitive commodities such as synthetic compounds and biologic materials such as DNA, RNA, stem cells, vaccines, tissue specimens, organs and other biologics, process intermediates and finish-goods products. In many instances, specialized temperature-controlled storage equipment and handling and/or manufacturing systems are designed to operate with a reliable, predictable supply of process consumables including raw materials, fuel, catalysts, thermal mass and thermal sources, which provide heating or cooling of commodities stored within the equipment at targeted temperatures. Failures and/or imbalances of supply can damage the equipment, degrade or destroy high-value commodities contained within the equipment, and can lead to the total loss or degradation of such commodities and the creation of undesirable by-products, waste and effluents.

Conventional monitoring systems are generally focused on direct measurement of conditions within the equipment. Conventional approaches to monitoring may be based on detecting failures when or after they have occurred or detecting exhaustion or low levels of process consumables in the equipment. Some equipment failures occur because of undetected exhaustion of the process consumables resulting from human error in ordering, delivering and provisioning a new supply or due to unforeseeable equipment breakdowns, malfunctions.

SUMMARY

Certain aspects disclosed herein relate to systems and methods used for monitoring, managing and predicting a failure in the delivery or provisioning of a process consumable such as a thermal mass or thermal energy source to various types of apparatus and/or configurations of apparatus.

In various aspects of the disclosure, a method of monitoring thermal mass or thermal energy sources used by remotely-located equipment includes receiving measurements captured by one or more sensors coupled to the equipment, the measurements including measurements indicating remaining quantities of thermal mass or thermal energy sources available for use by the equipment, monitoring replenishment events in which the thermal mass or thermal energy sources are resupplied, generating a usage characteristic describing a cycle of usage or consumption of the thermal mass or thermal energy sources based on historical measurements of quantities of thermal mass or thermal energy sources stored in the equipment or in supply tanks and a history of replenishment events, and scheduling one or more replenishment events based on the usage characteristic.

In certain aspects, the measurements indicating remaining quantities of thermal mass or thermal energy sources may include measurements of flow of thermal mass or thermal energy sources from one or more supply tanks. The measurements indicating remaining quantities of thermal mass or thermal energy sources may include measurements provided by sensors which indicate remaining level or quantities of thermal mass or thermal energy sources in a supply tank that are available for use by the equipment.

In certain aspects, the history of replenishment events indicates a number of events needed to provide an adequate supply to the equipment. Monitoring replenishment events may include monitoring an inlet to a tank in the remotely-located equipment, where the inlet is configured to receive a flow of thermal mass or thermal energy sources into the tank. The thermal mass or thermal energy sources may include a refrigerant. The thermal mass or thermal energy sources may include a temperature control material. Monitoring replenishment events may include receiving sensor data from a sensor coupled to a conduit, pipe, hose, manifold, outlet or manifold providing a connection in a supply system, where the conduit, pipe, hose, manifold, outlet or manifold is configured to provide a flow of thermal mass or thermal energy sources into a tank in the remotely-located equipment. Monitoring replenishment events may include receiving information from a service entity identifying a quantity of the thermal mass or thermal energy source introduced to a tank in the remotely-located equipment during a refill operation. Monitoring replenishment events may include correlating the information received from the service entity with measurements indicating remaining quantities of thermal mass or thermal energy sources in the equipment or supply tank servicing the equipment. Monitoring replenishment events may include correlating the information received from the service entity with measurements indicating cycles of supply events. Monitoring replenishment events may include using a temperature sensor to determine fill events as the liquid nitrogen flows through the supply line and where the supply line transitions from an ambient temperature to low temperature, which in some examples may be −196 degrees Celsius.

In certain aspects, the one or more sensors include a sensor coupled to a tank in the remotely-located equipment. The one or more sensors may include a sensor coupled to an outlet of a tank in the remotely-located equipment, where the outlet is configured to provide a measurement of fill events or flow of thermal mass or thermal energy sources to be consumed by the remotely-located equipment.

In some aspects, insufficiency or failure of the supply of thermal mass or thermal energy sources to remotely-located equipment based on the usage characteristic may be predicted. A loss of efficiency of the remotely-located equipment based on the usage characteristic may be identified.

In certain aspects, a usage characteristic or performance score may be applied to the remotely-located equipment indicating that operating performance has fallen below a nominal, achievable or optimal level of performance based on a comparison of the usage characteristic or score with an aggregated characteristic describing a cycle of usage of the thermal mass or thermal energy sources by a reference population of equipment similar to the remotely-located equipment. A change in operating conditions affecting the remotely-located equipment based on the score or usage characteristic may be identified.

In some aspects, the sensor data and information related to the replenishment events are received from a remote sensor controller through a routable communications network. The remote sensor controller may be configured to communicate analytical information and calculate scores based on a statistical analysis of measurements of performance of a refrigeration system associated with the at least one smart sensor.

In various aspects of the disclosure, an apparatus configured for monitoring thermal mass or thermal energy sources used by remotely-located equipment includes means for receiving measurements captured by one or more sensors coupled to the equipment, the measurements including measurements indicating remaining quantities of thermal mass or thermal energy sources available for use by the equipment, means for monitoring replenishment events in which the thermal mass or thermal energy sources are resupplied, means for generating a usage characteristic describing a cycle of usage or consumption of the thermal mass or thermal energy sources based on historical measurements of quantities of thermal mass or thermal energy sources stored in the equipment or in supply tanks and a history of replenishment events, and means for scheduling one or more replenishment events based on the usage characteristic.

DETAILED DESCRIPTION

Figure 1:
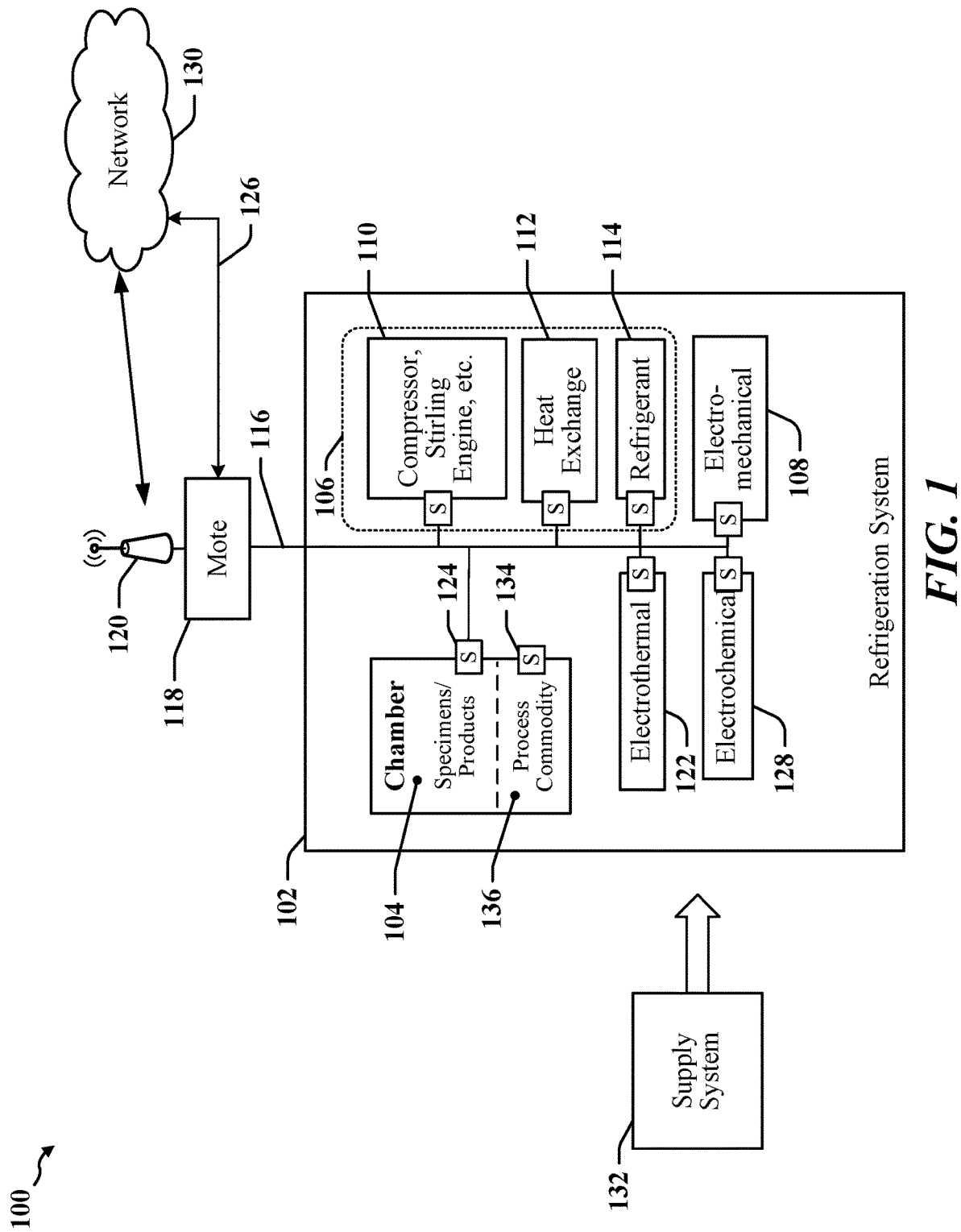
FIG. 1 illustrates a system configured to monitor assets equipped with sensors in accordance with certain aspects disclosed herein.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Overview

Specialized temperature-controlled storage equipment and handling and/or manufacturing systems are designed to operate with a reliable, predictable supply of process consumables including, but not limited to, raw materials, fuel, catalysts, coolants, electricity, a thermal mass such as a quantity of phase change material and/or other thermal sources, which provide heating or cooling of the commodities stored within the equipment at targeted temperatures. In one example, a temperature-controlled storage equipment consumes sources of thermal mass or thermal energy sources supplied to the equipment. According to certain aspects of this disclosure, both the source and supply of thermal mass or thermal energy sources and temperature-controlled equipment may be monitored using, for example, devices attached to the equipment. The devices may include sensors, sensor networks and/or sensor controllers. Monitoring performed by such devices can ensure proper operation of the equipment, and can provide an earliest warning of possible malfunction.

In some examples, in situ parameters can be monitored to determine the temperature, amount, concentration or level of industrial gases, thermal mass, phase-change materials, liquids and solids within a storage compartment. Measurement of such parameters can help determine whether the equipment has, in the static sense, an adequate supply of thermal mass or thermal energy sources to maintain targeted temperatures. A common failure occurs when the supply or delivery of one or more process consumables is insufficient due to increased demand, interrupted, impairment, breakdown, failure or damage to the equipment causing the thermal performance of the equipment to degrade over time until a measured parameter reaches a critical alarm threshold. In one example, failures can occur due to a door being left open on a storage tank, and/or a breakdown of the insulation material of the storage tank occurs. Certain aspects disclosed herein relate to improved monitoring that can provide the earliest possible warning of equipment failure due to a wide variety of factors. For example, some equipment failures can be avoided by ensuring availability of an adequate supply of thermal mass or thermal energy sources or refrigerants, and through prediction of equipment breakdowns and/or malfunctions. Cyclic or causal increases in demand can be predicted in certain instances.

In some aspects, systems and methods are disclosed that can monitor, manage and/or predict a failure in the delivery of a process consumable to various types of apparatus and/or configurations of apparatus. In one described example, the process consumable is a thermal mass or thermal energy source, which may include a bulk refrigerant supply that is be co-located with the cold-storage equipment used in research and manufacturing operations. In an example related to larger and/or newer facilities, a bulk-refrigerant supply such as a carbon dioxide ($CO_2$) or liquid nitrogen (LN2) storage system is situated exterior to the laboratory environment, in a parking lot or loading dock for example, and may provide a refrigerant supply to the equipment in the laboratory environment via insulated pipes. In one example, certain aspects disclosed herein enable the generation of an early warning before a temperature-controlled storage system fails to maintain its targeted temperature due to a detectable interruption or determination of insufficiency in the supply of a refrigerant source. A loss or degradation of high-value research or manufactured products may result if an earliest possible warning is not provided. In another example, certain aspects disclosed herein enable determination of occurrence or probable future occurrence of an interruption of supply.

In accordance with certain aspects of the present disclosure, process consumables used by the equipment may be monitored. Measurements may be captured by one or more sensors coupled to the supply or storage equipment that provide the process consumables. The measurements may indicate remaining quantities of process consumables available for use by the equipment. Replenishment events in which the process consumables are resupplied to the equipment may be monitored, and a usage characteristic may be generated to describe a cycle and/or amount of usage of the process consumables over time based on historical measurements of quantities of process consumables consumed by the equipment and a history of replenishment events. In some instances, the process includes scheduling or re-scheduling one or more replenishment events based on the usage characteristic. In some implementations, loss of insulation of the storage tank or another component may be identified, and greater demands on supply of thermal mass or thermal energy sources can be detected and identified as evidence of insulation damage or door opened events.

Predictive algorithms may be configured to identify and characterize trends and/or unexplained increases in replenishment events. The predictive algorithms may compare a current characterization of a system with a benchmark or baseline characteristic. In some implementations, the system operation and health may be characterized using monitored parameters and/or replenishment events and cycles. The predictive algorithms may detect and analyze trends and/or episodes that deviate from benchmark or baseline operations. The trends may be gradual, indicating deterioration of the system that may lead to system failure and/or inefficiency. Benchmark and baseline characteristics may be derived from operations of the system over a period of time in which the system is performing nominally. Benchmark and baseline characteristics may be generated using a population of comparable or peer systems.

In an aspect of the disclosure, one or more supply sources may be configured either as a single, shared or backup source. In one example, the amount of supply may be increased in a shared configuration by connecting multiple supply sources through a manifold. The manifold may include one or more supply lines (exit lines) that service corresponding storage assets. For example, multiple supply sources can be connected to a manifold and may operate individually and/or independently, such that when a sensor, apparatus or person detects or determines that one supply is depleted, another supply source is enabled to provide additional capacity, supply and redundancy through a peering arrangement among the supply sources. In one implementation, the supply sources are arranged in a manner analogous to a hub-and-spoke configuration. In another implementation the supply sources are configured in a shared or bussed configuration. Sensor measurement access points may be provided at one or more locations along the supply chain. In one example, one or more sensor measuring point is provided at a T-junction of each storage asset at the supply source. Disambiguation techniques may be implemented to determine the supply to total supply and/or demand from specific storage assets when a sensor is connected to a storage source at the T-junction of the supply source such that the point of connection and sensor measurement produces ambiguous sensor measurements due to demand from other storage assets downstream through the T-junction.

In an aspect of the disclosure, the amount of supply source supplied over time may be measured and normalized for access events, use, storage capacity and environmental factors such as room temperature, humidity, movement, vibration, elevation or orientation. The supply source may include LN2, liquid oxygen, liquid helium, dry-ice, $CO_2$, and/or another phase change material. The measurements can be analyzed, and a health or efficiency score mat be derived using one or more statistics. The statistics may include a variable for Normal Evaporation Rate (NER), a statistic which measures the efficiency of the insulation material or vacuum chamber designed into the equipment to provide insulation. Detectable changes in the NER value or score, in which NER is a variable, may be analyzed over time to detect liquid or vacuum leaks, degradation of insulation materials or loss of insulation efficiency due to loss of vacuum, and a signal may be output to indicate a need for repair or retirement due the detection of such events. In an aspect of the disclosure, exceptional circumstances may be accommodated through operational information related to a system that is provided by an operator or external system. For example, LN2 or CO2 may be introduced or injected into an ultralow temperature freezer when a power failure occurs. The act of adding thermal mass and/or a thermal energy source may be undetectable by a sensor array associated with the ultralow temperature freezer, and may be unaccounted. In some instances, the quantity of LN2 or CO2 added to the system may be provided to the monitoring system when power is restored. In some instances, the monitoring system may be informed of the addition of LN2 or CO2 and may calculate, estimate and/or attribute the effect of the additional thermal mass and/or energy source on the operational state of the ultralow temperature freezer after power is restored.

In one aspect of the disclosure, a sensor or statistic associated with the process of supply replenishment measures the time to fill a temperature-controlled storage system. The measurement or statistic may be used to assess the amount of, or changes in the quantity of material stored over time, malfunctions in the supply apparatus, and/or NER.

Certain failures of cold-storage equipment can occur because consumption of thermal mass or thermal energy sources has exhausted the source of supply of the thermal mass or thermal energy sources. Examples of thermal mass or thermal energy sources include LN2, liquid oxygen, liquid helium, or dry-ice, carbon dioxide (CO2), or other phase change material. In one example, the supply of thermal mass or thermal energy sources may become depleted due to failures and/or errors in ordering, delivering and provisioning a supply source. In another example, thermal mass or thermal energy source supplies may become depleted due to unforeseen or undetected increases in demand that accelerate consumption of a thermal mass or thermal energy source in comparison to historical trends, such as increases in access activity, changes in environmental conditions, failure of the insulation material or vacuum chamber surrounding the storage container containing the process.

Various aspects of the disclosure relate to systems, apparatus and methods that may be used to monitor, manage, control and report on the operation of equipment that may be deployed locally or remotely and/or in large numbers. In some implementations, aspects of the presently disclosed invention system may be employed to monitor heating systems, manufacturing systems, combustion systems including waste disposal systems and water treatment systems. To facilitate description of certain aspects, specific details related to refrigeration and/or freezer assets will be given, and it will be understood that the aspects may be practiced without these specific details. In one example, methods, apparatus, and computer program products are described in relation to temperature-controlled systems such as refrigeration systems and refrigeration assets, including ULT refrigerators and freezers, refrigeration plants and cold-storage facilities comprising large numbers of refrigeration assets.

Example of Equipment Requiring Process Consumables Resupply

FIG. 1 is a block diagram illustrating a simplified example 100 in which a walk-in refrigerated room or refrigeration system 102 may be monitored in accordance with certain aspects disclosed herein. The example of a refrigeration system 102 is used to facilitate description of certain concepts, features and elements without limiting the scope of application of such concepts, features and elements. It will be appreciated that the various concepts, features and elements disclosed herein apply equally to a heating system, thermodynamic motors (heat engines), as well as compressed air engines, including pneumatic motors used in manufacturing production line equipment (e.g., pumps, motors, presses, spray painting devices, vacuum formers, etc.).

For the purposes of this description, a refrigeration system 102 may comprise one or more of a freezer, refrigerator, storage space or room in which the temperature is controlled in order to maintain contents of a storage space or chamber 104 within a desired or required temperature range. In another example, the refrigeration system 102 may be embodied in a heating, ventilation, and air conditioning (HVAC) system that maintains temperatures in an enclosure, vehicle, room, building or other space at higher temperatures, including a temperature range that is above 0° Celsius. For example, an HVAC system may be configured to maintain temperature around 15° Celsius, a refrigeration application may be configured to maintain an internal temperature within a range of 2 to 8° Celsius, and a freezer may be operated in a range that can vary between 0° for a frozen application and −196° for a liquid nitrogen deep-frozen application.

In one example, the refrigeration system 102 may be fitted with sensors that can be coupled through a communication link (depicted here for convenience as a sensor bus 116) that enables individual sensors to communicate with one or more remote monitoring devices (which may be referred to herein as a Mote 118). In some examples, one or more sensors may communicate wirelessly with the Mote 118. The Mote 118 may be configured to receive measurements that enable monitoring of environmental conditions, operating conditions, thermodynamic cycles, power supplies, and other systems, characteristics and attributes associated with the refrigeration system 102, based on data sampled from, or otherwise provided by the sensors. The Mote 118 may be adapted or configured to communicate with a remote server through a network 130. In some instances, the Mote 118 may be wirelessly coupled to the network 130. In some instances, the Mote 118 may be coupled by a wired interface 126 to the network 130. In some instances, the Mote 118 may be coupled to the network 130 through an intermediary device, such as an aggregator, router, gateway, or server (not shown).

One or more smart sensors may be employed to monitor certain features, characteristic and/or operations of the refrigeration system 102. The smart sensors may be implemented as a combination of the Mote 118 and one or more sensor devices operated, monitored and/or controlled by the Mote 118, which may be enclosed in a common package in some implementations. In some examples, the smart sensor includes internal circuits and modules that enable the smart sensor to communicate with a network 130 directly or through an intermediary device, such as an aggregator or the Mote 118. In some examples, the smart sensor and/or the Mote 118 may be configured to communicate using a meshed network 130.

According to certain aspects disclosed herein, sensors may be deployed to monitor equipment operational characteristics of monitored equipment and environmental conditions external or internal to the monitored equipment, or characteristics of radio frequency performance associated with the Mote 118 may be evaluated to determine reliability of one or more communication links, or location or changes in location of the refrigeration system 102, or Mote 118 associated with it. In the example of the refrigeration system 102, the sensors may monitor analog or digital outputs or measure electrical current, acoustic energy, voltage, door position, temperature, pressure, mechanical strain and/or vibrations within or surrounding the refrigeration system 102. The refrigeration system 102 may comprise one or more chambers 104 or another temperature-controlled storage space that is maintained at a desired temperature by a refrigeration source or supply system. In one example, a refrigeration system 102 may include a compressor 110 (or another device such as a Stirling engine), a heat exchange system 112, a refrigerant reservoir 114 that provides a thermal mass or thermal energy source, a phase-change material or other type of refrigerant used in a cooling cycle. The refrigeration system 102 may include other electro-mechanical components 108 or electro-chemical components 128, including thermoelectric cooling (Peltier cooling) components. The electromechanical components 108 may include a Stirling engine, compressors, a motor, a pump, a valve, or other such devices that may found in a refrigeration system 102, a heating system, and/or manufacturing equipment. The refrigeration system 102 may include a refrigerant reservoir 114 that may be implemented as an internal or external tank configured to maintain a supply of thermal mass or thermal energy sources, where the refrigerant reservoir 114 may be adapted to be replenished by a supply system 132.

According to certain aspects disclosed herein, one or more sensors 124, 134 may be configured to monitor state of the commodities in the chamber 104 and thermal mass or thermal energy sources supplied by the refrigerant reservoir 114. Other sensors may be configured to monitor various aspects of the refrigeration system 102 and supply system 132, as well as activities related to resupply of thermal mass or thermal energy sources. In one example, a sensor may measure flow of fluid through external ports and fluid couplings, conduits, pipes, hoses, outlets and/or manifolds used to resupply the refrigerant reservoir 114. In another example, the Mote 118 and/or an application processor may calculate volume of fluid added to the refrigerant reservoir 114 based on measured flow through the external ports and fluid couplings, conduits, pipes, hoses, outlets and/or manifolds. In another example, the Mote 118 and/or an application processor may calculate or estimate volume of fluid added to the refrigerant reservoir 114 based on knowledge of flow rate per unit of time and the number of units of time that a solenoid is active and/or a valve is open. A consumables sensor 134 may be attached to the cold-storage equipment to determine the level or amount of the thermal mass or thermal energy source in active use, and may communicate with the Mote 118 through a wireless or wired communication link. The communication link may include a network that enables data to be transmitted by means of a single logical connection between a source and destination address using a routable protocol, the Internet being one example, where the route is not known, a priori, to either the source or destination address. The consumables sensor 134 may alternatively or additionally communicate data to a remote application server, and/or may store sensor reading for later recovery and transmission to the application server. In various aspects, the consumables sensor 134 may be adapted to measure multiple parameters (e.g., presence of vapor, flow, temperature, liquid level, volume, or pressure).

In some instances, consumables sensors 134 may enable the Mote 118 and/or an application processor to estimate a flow of fluid from the cooling subsystem 106, and the Mote 118 and/or an application processor may calculate volume of fluid depleted from the refrigerant reservoir 114, based on measured flow, temperature and pressure within the refrigerant reservoir 114. In another example, one or more sensors provided in the refrigerant reservoir 114 and/or the supply system 132 may measure flow of fluid exiting the supply system 132 and carried to the refrigerant reservoir 114.

Figure 2:
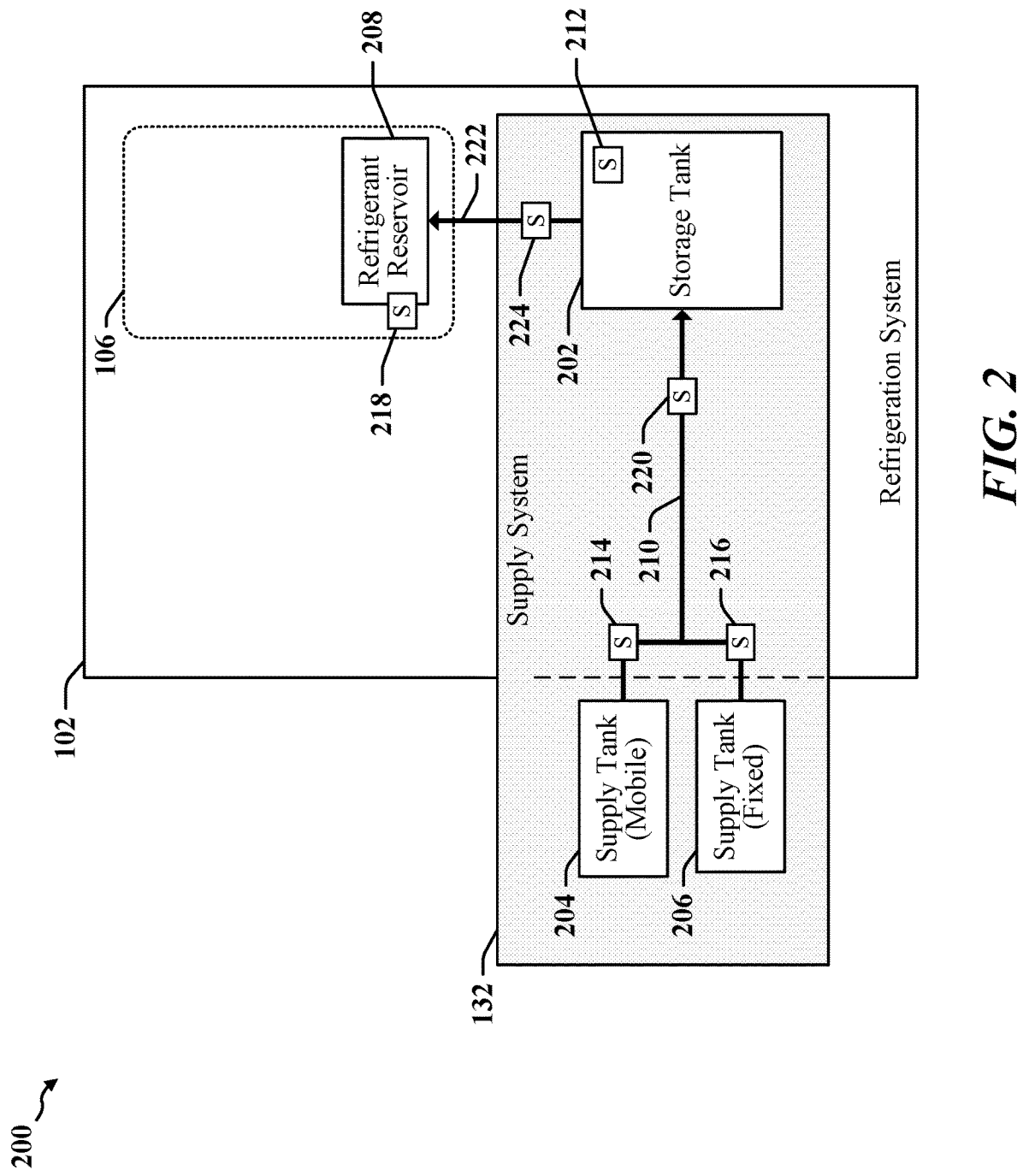
FIG. 2 illustrates certain aspects of a supply system that may be instrumented and monitored in accordance with certain aspects disclosed herein

FIG. 2 is a block diagram 200 that illustrates certain aspects of a supply system 132 that may be instrumented and monitored in accordance with certain aspects disclosed herein. The size, structure and location of the components in the supply system 132 may vary between applications and may depend upon system requirements and physical conditions. In various implementations, the supply system 132 has multiple parts, including a supply tank 204, 206 and a storage tank 202. The storage tank 202 is typically provided within the structure of the refrigeration system 102, or collocated and coupled to the refrigeration system 102 during normal operation. The storage tank 202 typically maintains the level of a refrigerant reservoir 208 that represents the refrigerant that is in active use by the cooling subsystem 106. The refrigerant reservoir 208 may represent a volume of refrigerant that is present in couplings, conduits, pipes, hoses, outlets and/or manifolds and other elements of the cooling subsystem 106 and may, in some instances include a volume of refrigerant held in a smaller buffer or other tank. A coupling system 222 controls flow of refrigerant between the storage tank 202 and the cooling subsystem 106. The storage tank 202 may receive refrigerant from one or more supply tanks 204, 206 through a coupling system 210. In many implementations, supply tanks 204, 206 are located outside the physical confines of the refrigeration system 102. In other implementations, a physically large refrigeration system 102 may include a fixed supply tank 206. In many implementations, a mobile supply tank 204 is used to periodically resupply the storage tank 202. The physical structure of a mobile supply tank 206 is largely determined by the volume of refrigerant carried in the mobile supply tank 206. In one example, the mobile supply tank 206 may be a bottle mounted on a wheeled carriage. In another example, the mobile supply tank 206 may be implemented using a motorized vehicle.

Various elements of the supply system 132 may be instrumented. In one example, one or more sensors 212 may be deployed within the storage tank 202 to measure temperature, liquid level, pressure and/or presence of vapor. In another example, one or more sensors 224 may measure flow, temperature, liquid level, pressure and/or presence of vapor in the coupling system 222 provided between the storage tank 202 and the cooling subsystem 106. In some implementations, the one or more sensors 212 associated with the storage tank 202 include a strain gauge or load cell that can be used to measure weight or changes in weight of the storage tank 202. The weight change may be correlated with depletion or flow of refrigerant. A strain gauge or load cell may be attached internally, externally to the storage tank 202, and/or may be attached to a platform or harness that supports the weight of the storage tank 202. In another example, one or more sensors 214, 216, 220 may measure flow, temperature, liquid level, pressure and/or presence of vapor in the coupling system 210 provided between the storage tank 202 and one or more supply tanks 204, 206 when a supply tank 204, 206 is coupled to the storage tank 202. When the supply system 132 is designed to have one or more supply tanks 204, 206 and a supply tank 204, 206, the one or more sensors 214, 216, 220 may provide information indication disconnection of the coupling 210 between a supply tank 204, 206 and the storage tank 202. The refrigerant reservoir 208 may also be monitored using one or more sensors 218 coupled to the cooling subsystem 106 that are configured to monitor and/or measure refrigerant flow, temperature, liquid level, pressure and/or presence of vapor within the cooling subsystem 106 and/or flowing into or out of the cooling subsystem 106. In some implementations, the one or more sensors 218 measuring refrigerant in the cooling subsystem 106 include a strain gauge or load cell that can be used to measure weight or changes in weight of the cooling subsystem 106. A strain gauge or load cell may be attached internally, externally to one or more elements of the cooling subsystem 106, and/or may be attached to a platform or harness that supports the weight of such elements of the cooling subsystem 106.

In some instances, a Mote 118 may include a processing circuit, storage and one or more transceivers operable to connect the Mote 118 to the network 130. Connections may be continuous, continual, opportunistic, or otherwise established when an available network connection is detected. The Mote 118 may operate as data logger that stores various information received or generated by the Mote 118. In some instances, the Mote 118 may be adapted to perform certain data processing tasks on sensor data.

In some examples, equipment location, analytical measurements and other information may be communicated through the network 130. Equipment location, analytical measurements and other information may be obtained from other sources, including descriptive, qualitative or quantitative data entered manually at or near the refrigeration system 102, or entered through a networked console, terminal and/or mobile computing device. In one example, information representing equipment location and/or other manual measurements taken during the service or maintenance of the system may be provided through a mobile computing device 308 (see FIG. 3), which may operate at a fixed location or which may roam through the area(s) to be monitored.

In some instances, the Mote 118 may, on a periodic basis, survey other sources of information related to the equipment and thermal mass or thermal energy source, such as energy consumption and/or current flow in relation to the production of refrigeration by mechanical means such as the compressor 110, heat exchange system 112, and/or other electromechanical components 108, as well as other apparatus housed within the refrigeration system 102. The Mote 118 may be configured to process the measurements to generate raw statistical data and perform certain filtering or statistical analysis, such as identifying trends, transitions from normal to abnormal operation based on crossings of threshold values, etc. or such statistical analysis may be performed by other systems, including systems accessible through a network. The Mote 118 may be configured to store and maintain a history of measurements, trend information and other metadata. The Mote 118 may be configured to use a wired or wireless network interface to transmit stored information, raw measurements, alarms and status information and may signal occurrences of exceptions to normal operation to a centralized or distributed monitoring system and/or a centralized or distributed controlling system. A network interface may support communications with a network 130 that may comprise local networks, ad hoc networks, proprietary wide area networks, networks of servers, and/or public networks including networks accessible through a routable network such as the Internet.

Certain aspects of the disclosure relate to a variety of types of refrigeration systems 102, including consumer, industrial or commercial freezer/refrigeration systems or bio-repository farms and walk-in rooms comprising large numbers or areas of refrigeration systems 102. The systems and methods disclosed herein may be used to monitor and analyze performance of refrigeration systems 102, and can identify and select refrigeration systems 102 in need of attention. Various examples of systems and methods for monitoring, managing and predicting a failure in the delivery of thermal mass or thermal energy sources consumed by equipment used in research and manufacturing operations are disclosed. Certain examples relate to cold-storage systems such as liquid nitrogen or cryogenic storage tanks, which consume dry-ice, $CO_2$ gas, liquid nitrogen, phase-change materials, and/or other liquids and solids usable as refrigerant sources, which may be herein referred to as thermal mass or thermal energy sources. Certain examples illustrated herein relate to equipment such as Mass Spectrometers which consume industrial gases such as methane, argon, ammonia and hydrogen. Certain examples relate to incubators that consume carbon dioxide, oxygen and/or other industrial gasses to facilitate incubation of organic materials. An uninterrupted supply of these industrial gases, thermal mass and/or thermal energy sources can be critical to the operation of equipment. In the example of the refrigeration system 102, an uninterrupted supply of refrigerant sources is required to protect the content stored within the chamber 104 of a refrigeration system 102.

In some aspects, sensors and/or digital switches may be deployed to monitor temperature, pressure, fluid flow, acoustic energy, vibration, infrared radiation, weight, and other state information in order to determine the frequency of thermal mass or thermal energy source resupply events. Consumables may be resupplied by routine deliveries or through manually, remotely-activated and/or fully automated supply systems. The frequency of resupply may be compared or contrasted to a demand baseline, which may be normalized for access activity or environmental conditions. A determination may be made as to whether the current rate or quantity of supply is sufficient based on an analysis of historical demand. Sensors attached to, placed upon or located within equipment and/or data harvested digitally from an electronic controller associated with the equipment may be used to generate data sets that can be analyzed to determine the sufficiency or insufficiency of the supply of the thermal mass or thermal energy source in comparison to a demand baseline obtained, for example, from the analysis of historical demand. Demand load can be determined by measuring or estimating current usage and identifying periods over time when supply events are active, and may take into account a comparison of demand load with internal storage temperatures of the equipment. Demand load can be affected by changes in room ambient temperature, the introduction of new products, specimens or materials at a higher or lower temperature or access events due to door or cap openings and the duration of the openings. The time, number and duration of the access events may be monitored and alarmed according to pre-set or calculated limits associated with the equipment, which may be set with consideration given to the types of materials contained within the equipment chamber 104.

In some examples, supply in relation to demand can be monitored to derive an optimized delivery schedule of thermal mass or thermal energy sources, including refrigerant sources, from bulk storage tanks based on historical, present and forecasted trends.

Transportation and labor can account for a majority of the cost of delivering thermal mass or thermal energy sources. Certain methods disclosed herein relate to determining and reporting the economic and optimal delivery schedule or re-fill intervals based on an evaluation of past, present and projected demand. From this information, adjustments can be made to the delivery schedule of the thermal mass or thermal energy sources to minimize operating and delivery costs. Some methods are operable in applications in which some equipment is not provisioned with a monitoring system which may be omitted due to high implementation costs, for example. Some methods are operable in applications in which the equipment has an electronic controller that measures some parameters which may trigger and report alerts and alarm outputs when a parameter measured by a sensor placed within a storage tank, or elsewhere in the equipment, after the measured parameter crosses a pre-set alarm setpoint. Alerts and alarms are conventionally provided after the onset of equipment failure has occurred due to the failure, delay or interruption of a refrigerant supply source or thermal mass or thermal energy sources.

According to certain aspects disclosed herein, information obtained from monitoring consumption rates and supply of thermal mass or thermal energy sources can be used to anticipate and prevent equipment failures. Equipment failures can occur when delivery of the thermal mass or thermal energy sources is interrupted, exhausted or delayed. In one example, a worker may fail to manually fill, replace or replenish thermal mass or thermal energy sources in accordance with a periodic delivery schedule, operating procedure and/or protocol. In one example, an automated control system may fail to deliver thermal mass or thermal energy sources from bulk-supply tanks, or the thermal mass or thermal energy sources in the bulk-supply tanks may be exhausted. Misconfiguration, improper use, failure of equipment, frequent access events or failure or improper maintenance of equipment or improper installation can also result in the failure of storage and other equipment which require an uninterrupted supply of thermal mass or thermal energy sources. An interruption of supply can often result in increased operational costs or catastrophic loss of research specimens or manufactured products contained within the chamber 104.

Certain aspects disclosed herein relate to techniques that employ low-cost sensors coupled or attached to a controller associated with a fill or supply system 132 (e.g., a LN2 supply or gas bottle) to monitor the supply of thermal mass or thermal energy sources consumed by monitored equipment (e.g. the refrigeration system 102). Alerts, alarms and certain actions may be initiated based on an evaluation of a history of measurements obtained by one or more sensors 124, 134, 212, 214, 216, 218, 220, 224 that monitor a temperature-controlled storage system or the level of thermal mass or thermal energy sources 136 used to maintain the environment of the chamber 104. Past, present and/or future trends may be determined from historical and more recent measurements. In some examples, evaluations of historical and current measurements may include normalization of the data to account for internal factors such as the status, condition or age of materials of stored, or for environmental variables such as room temperature, humidity, vibration or events associated with door access or use of the equipment. Demand can be determined by evaluating supply levels and activity over time in relation to the level of thermal mass or thermal energy sources 136.

Detectable changes representing cycles of supply and demand of the thermal mass or thermal energy sources may be characterized using statistical, frequency, pattern analysis and artificial intelligence techniques. Present and future health and condition of the equipment can be determined or predicted by comparing the amounts and periodicity of delivery of the thermal mass or thermal energy sources with historical demand to determine if an event of interrupted or insufficient supply is occurring so that an earliest possible warning and corrective, preventative or other mitigation actions can be taken before the storage or equipment contents are affected.

One common type of equipment failure occurs in liquid nitrogen bulk-storage systems. These systems, which may be referred to as Dewars, freezers, or LN2 or liquid nitrogen freezers which may be capable of maintaining storage temperatures of −196° C. Liquid nitrogen storage tanks are used extensively in research organizations and life science companies to store research specimens, and may be used by pharmaceutical companies to manufacture and store temperature-controlled products. The unexpected failure of a liquid nitrogen storage system can result in the catastrophic loss of high-value, mission-critical research specimens or manufactured product.

Certain embodiments of the present invention employ systems and methods for determining current status of equipment and predicting the future health and performance of monitored equipment based on measured variables such as NER, liquid level, temperature of the thermal mass or thermal energy source, gas concentrations or pressures, and/or vapor state within a tank, container or other equipment. In one example, a predictive approach is taken, in which an evaluation of historical demand in relation to the supply of the thermal mass or thermal energy sources and level of thermal mass or thermal energy source in the chamber 104 is used to determine if an interruption of supply is probable, possible and/or expected at some future point in time, before the amount of thermal mass or thermal energy sources 136 used to maintain the chamber 104 is affected by an interruption.

In certain aspects, historical measurements and recorded activities may be used to generate a benchmark or baseline that characterizes nominal operation of a system. Some deviations from the benchmark or baseline may be episodic and indicative of a temporary change, such as a door opening, temporary power loss, and so on. In other instances, deviations from the benchmark or baseline may be gradual and trend analysis may predict component or system failure or loss of efficiency. Performance of a system can be scored based on performance relative to the benchmark or baseline, and the score assigned to one system can be used measure the performance of the system relative to other systems. In some implementations, system performance may be represented on a distribution curve, and outliers on the negative side of a distribution curve can be identified as malfunctioning or tending to failure because they have a low score low relative to their peers.

In certain aspects, the supply system 132 may be profiled in a baseline or benchmark. For example, the number and frequency of fill events or cycles and duration of the fill cycles may be measured. A lack of fill events may be indicative of a refrigeration system that is performing within expectations. Increasing occurrences of fill events that is not accompanied by episodic events such as door openings may indicate a loss of insulation, for example.

The periodicity of fill events or cycles is typically significantly greater than the periodicity of other baseline characteristics of a refrigeration system. For example, the cooling cycle in a refrigeration system that is in a stable, event-free condition may be associated with a frequency that is one or more orders of magnitude greater than the frequency of episodic variations associated with a refrigeration system that is subject to deposits or withdrawals of specimens at least once on average in each 24-hour period. The frequency of episodic variations may, in turn, be one or more orders of magnitude greater than the frequency of fill cycles. The analysis of characteristics against baselines or benchmarks can detect deviations and trends regardless of the underlying fundamental frequency of the characteristics.

Sensors 214, 216, 220, 224 that monitor the coupling systems 210, 222 of the supply system 132 can provide measurements used to detect resupply cycles. In one example, the cycling of LN2 through a coupling system 210, 222 may establish a pattern of supply that can be used to characterize operations and that can be compared to a baseline or benchmark characteristic. In some instances, the sensors 214, 216, 220, 224 may detect the cycling of LN2 flow by measuring flow, pressure, acoustic, vibration, etc.

An application server may be employed to obtain, collate and process sensor data, including data obtained from an electronic controller attached to the monitored equipment. In one example, the application server may be accessed through a web browser by users provided with distinct login identification and passwords. In certain embodiments, systems and methods are provided that determine the economically optimal delivery schedule of the thermal mass or thermal energy sources to replenish equipment in situ, or to refill bulk-storage tanks and containers providing supply to the equipment. The monitored equipment may be monitored using one or more sensors 124, 134, 212, 214, 216, 218, 220, 224 that may communicate through wired or wireless links with a network that enables raw sensor data, processed sensor data, aggregated sensor data and/or other information to be transmitted to the application server for evaluation.

Data may be processed, evaluated and/or plotted against time to generate supply and demand profiles for each type and/or instance of monitored equipment. Monitored equipment and its current and future state may be represented algorithmically, using a mathematical function, such as a sine wave, and/or through statistical analysis or modeling.

The application server may be configured to group and rank equipment according to the types of thermal mass or thermal energy sources and the amount supplied in relation to demand, based on analysis and inferences drawn from historical supply and demand profiles generated by the application from information associated with monitored equipment, including sensor data, and/or from federated data stored in a database that relates to equipment of like, same, similar or different equipment design. The information associated with the monitored equipment and other information may be used to benchmark score the performance of the monitored equipment against its peers characterized in the database, or to determine an economically optimal design or capacity of the tanks which comprise the storage equipment and supply apparatus, the optimal times and routes for manual replenishment of the thermal mass or thermal energy sources based on measurements from sensors that have known correlations with supply and demand of the monitored equipment or as inferred from an analysis of its peers, with the result of improved productivity, reduced risks, operational costs, optimization of deliveries, faster service and better utilization of capital.

Certain aspects provide methods for determining or inferring equipment efficiency as measured by comparing the total cost or volume of the thermal mass or thermal energy sources over time, with the production output or storage capacity of the equipment. Statistics and modeling outputs may be represented as a score indicating the performance of the equipment relative to its peers. The data and scores may be normalized for environmental variables such as altitude, temperature, vibration, tilt, humidity and door access activity. Other embodiments of the scoring principle might include a statistic for total cost of ownership, which can provide a score of economic efficiency based on an evaluation of acquisition costs, energy consumption, depreciation, service life, floor-space, repair costs and cost per unit of capacity. In some instances, the data and scores may also be used to determine or re-determine the optimal delivery volume or frequency of delivery or replenishment of the thermal mass or thermal energy source.

According to certain aspects disclosed herein, a score statistic may be provided that enables a comparison of equipment being monitored with other similar new or used equipment of a like, same, similar or different size, insulation efficiency or design to determine the economic feasibility of exchanging or replacing the equipment with another to achieve a better operational or economic result.

According to certain aspects disclosed herein, an interface may be provided to enable a user to manipulate or filter a 3D map with legends, symbols and icons representing the location, frequency of use or utilization, total cost of ownership and relative efficiency and reliability of the equipment providing a visual representation of the business and operational intelligence value of the scores and data. Certain aspects facilitate the movement or relocation of the temperature-controlled storage system or equipment is determined through the use of sensors which causes changes on the 3D map. A controller, processor and/or application may issue an alarm if monitored equipment is moved to a new location, and/or if the new location falls outside a defined or permissible location.

In accordance with certain aspects disclosed herein, events related to manual fill or replenishment can be determined by identifying the approach, presence or departure of a person or apparatus (robot) associated with an inspection, maintenance, fill or replenishment process. Presence of the person or apparatus may be detected by the appearance and/or persistent presence of a wireless, infrared or acoustic device signal that communicate an identifier (ID) known to be associated with the person or apparatus. Presence and activity of the person or apparatus may also be monitored to support access control and security operations. In some instances, the person may be identified by RF-enabled equipment or by apparatus carried by the person. For example, a person may be identified by a radio frequency identification (RFID) badge and/or a MAC address or other identifier associated with a cell phone. The identity of a person may be captured in order to determine who was present when access or management of the storage tank 202 and/or the supply tank 204, 206 occurred. The identity of a person may be recorded and/or used for security and access purposes. In some instances, a sensor affixed to the temperature-controlled storage system may be configured to detect a connection, such as the opening of an access door or removal of a cap, to a portable bulk-supply tank. For example, a sensor may include a magnetic contact switch, electric contact switch, reed switch, capacitive contact switch or other contact switch. Sensors that monitor supply system connections and disconnections may be assigned a unique identifier or code use for communicating events associated with the supply system.

Certain aspects provide techniques by which the contents of the temperature-controlled storage system or equipment may be determined through an inventory management process, the space occupied by the contents are compared to maximum or minimum capacity to generate a space efficiency or utilization statistic which may become a basis by which contents are consolidated into more or fewer items of storage or supply equipment.

Figure 3:
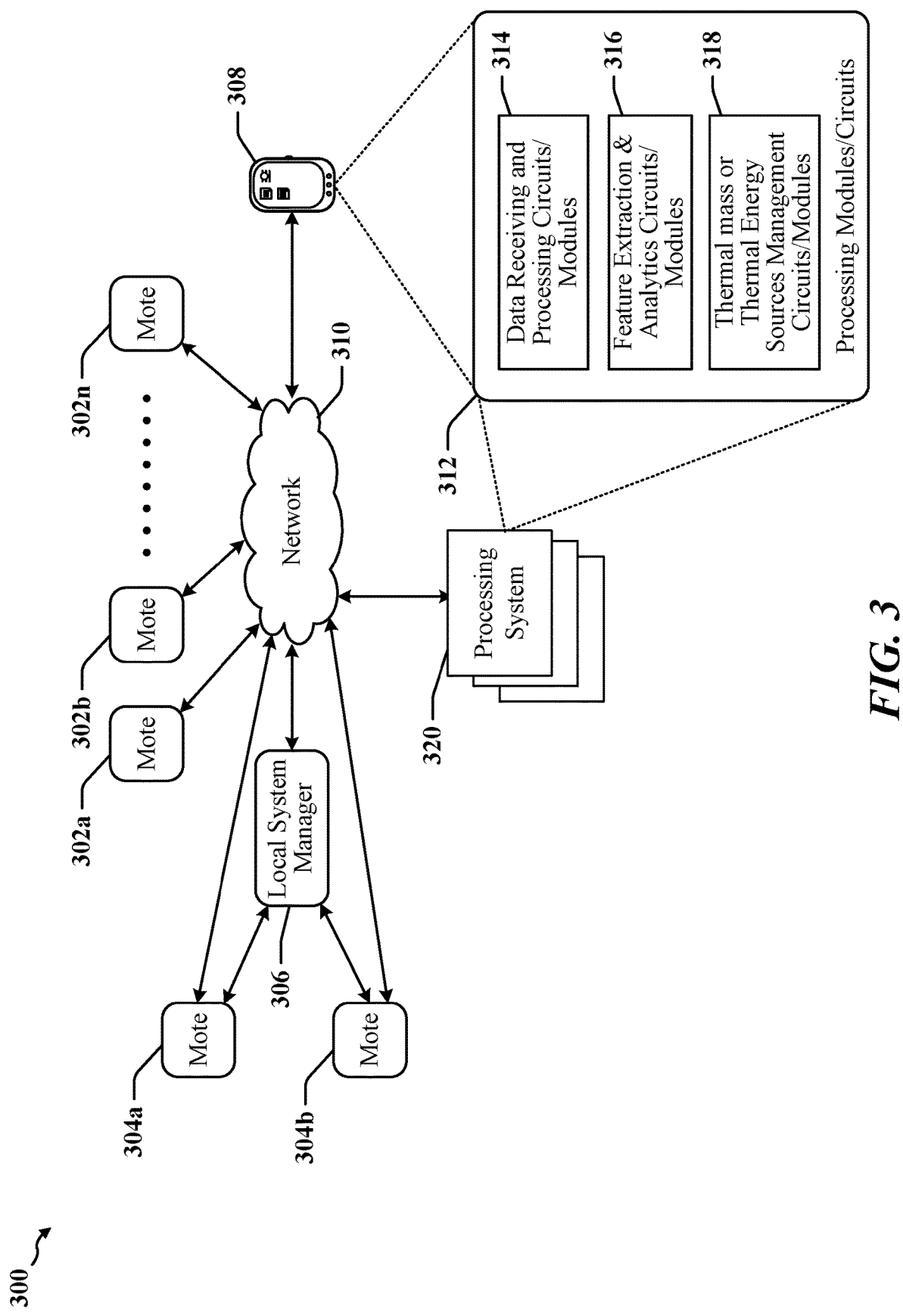
FIG. 3 illustrates a network of devices that may be deployed to monitor various types of assets in accordance with certain aspects disclosed herein.

FIG. 3 is a simplified block diagram illustrating a network of devices 300 that may be deployed to monitor various types of assets in accordance with certain aspects disclosed herein. A plurality of devices, including Motes 302a-302n, 304a, 304b, may be adapted or configured to sample data produced by one or more sensors, and to transmit the sensor data to a mobile computing device 308 and/or processing system 320. In one example, the processing system 320 may include one or more processing circuits and/or systems that are accessible through a network 310, which in one example may include the Internet and/or a network of servers accessible through the Internet. In another example, a mobile computing device 308 may be configured to enable field service personnel to interact with certain portions of the processing system 320 and equipment targeted during service calls. The mobile computing device 308 may include one or more wired or wireless transceivers and/or line drivers and receivers that enable the mobile computing device 308 to communicate with certain of the Motes 302a-302n, 304a, 304b, and/or the network 310. In some instances, the mobile computing device 308 includes, or may be coupled to one or more external sensors that can be used to monitor an asset during field servicing. In some instances, the mobile computing device 308 may interface with a computing system or other intelligent device provided within a managed asset.

The mobile computing device 308 and/or processing system 320 may include modules and/or circuits 312 adapted or configured to communicate with and/or control the Motes 302a-302n, 304a, 304b. For example, certain circuits and/or modules 314 may be configured to receive and process sensor data sampled by the Motes 302a-302n, 304a, 304b, circuits and/or modules 316 configured to process the sensor data to derive sensor metrics used for determining health of assets and changes or differences in health of an asset with respect to peer assets and/or relative to prior states of the asset, and circuits and/or modules 318 configured to track depletion of thermal mass or thermal energy sources, and/or determine when depletion passes threshold levels that may affect operation, health and/or integrity of monitored equipment.

In the example, certain Motes 302a-302n may communicate with a network 310 using wired or wireless communications technology. Some Motes 304a, 304b may communicate with the network 310 and/or may be coupled to a local system manager 306, which may be configured to collect, aggregate, process and/or forward sensor data from the Motes 304a, 304b. In some implementations, one of the Motes 302a-302n may perform at least some of the functions of a local system manager. In some implementations, one or more Motes 302a-302n may sample, collect, aggregate, process and/or forward data from one or more sensors associated with an asset. In some instances, certain of the Motes 304a, 304b may be adapted to sample data from sensors associated with two or more assets.

Figure 4:
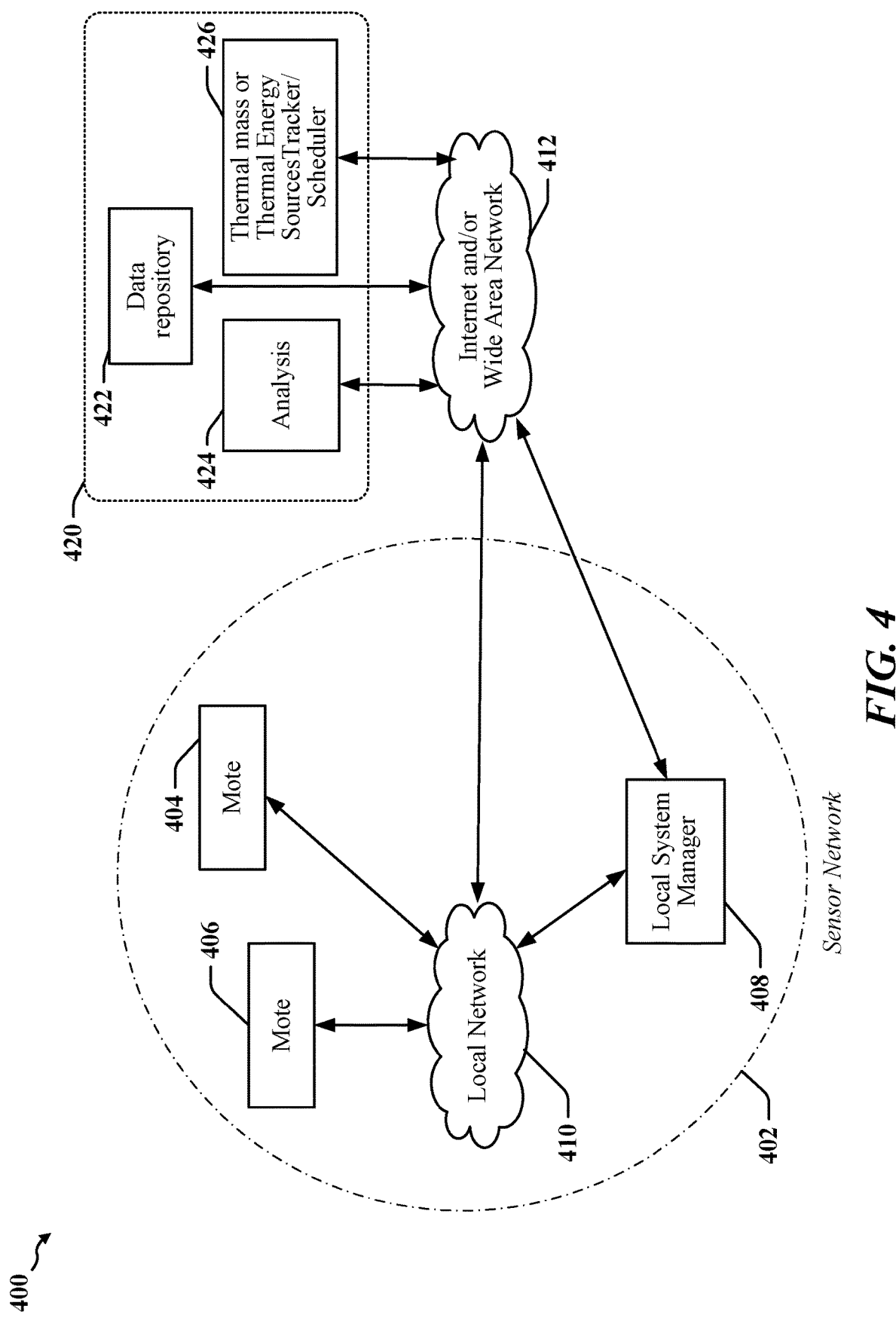
FIG. 4 illustrates an example of a system configured to provide centralized or distributed control and/or monitoring of assets in accordance with certain aspects disclosed herein.

FIG. 4 is a schematic diagram 400 illustrating an example of a system configured to provide centralized or distributed control and/or monitoring of assets. Motes 404, 406 may be deployed to communicate with, and/or control sensors that monitor certain aspects of a plurality of corresponding monitored equipment. On a large campus, a sensor network 402 may be configured to more efficiently collect and distribute sensor data sampled by Motes 404, 406 from sensors, and/or from other sources associated with monitored equipment within the campus. The sensor network 402 may conform to a hierarchical architecture. In one example, a sensor network 402 may have one or more local system managers 408 that are deployed to collect and/or aggregate sensor data and other information provided by the Motes 404, 406. In some implementations, a local system manager 408 may manage and/or comprise a network of controllers and/or device managers. The Motes 404, 406 and the local system manager 408 may communicate through a local network 410, which may comprise a wired or wireless network.

The sensor network 402 may be coupled to a processing system 420 through a network 412 that may comprise a proprietary wide area network and/or a public wide area network such as the Internet. The processing system 420 may be centralized or distributed over a plurality of networked computing systems. The processing system 420 may provide a plurality of functional elements and devices, including a data repository 422, which may include a database system, an analysis system 424 that may be configured to process and analyze measurements, statistical data and trends, metadata and other information received from the sensor network 402. The analysis system 424 may employ historical data, profiles, design goals and other information maintained by the data repository 422 to review, process and otherwise analyze information received from the sensor network 402. The analysis system 424 may use a digital ledger, implemented using a blockchain to record historical data, profile changes, error detections and alerts, maintenance activities, resupply transactions, security and access control events, and the like. The thermal mass or thermal energy source tracker/schedule processing system 426 may provide a delivery optimization system to determine the optimal schedule, frequency, amount and route to minimize transportation costs and labor associated with the replenishment process. The processing system 420 may include a thermal mass or thermal energy source tracking system that can be used to determine levels of stored thermal mass or thermal energy sources, depletion rates, changes in depletion rates and depletions of thermal mass or thermal energy sources that may threaten the operation, integrity and or health of monitored equipment using information received or retrieved from the sensor network 402, the analysis system 424 and/or the data repository 422. The processing system 420 may be configurable to schedule deliveries and/or modify or optimize delivery schedules based on determinations of levels of stored thermal mass or thermal energy sources, depletion rates, changes in depletion rates and depletions of thermal mass or thermal energy sources that may threaten the operation, integrity and or health of monitored equipment.

In certain embodiments, Motes 404, 406 and local system managers 408 of the sensor network 402 may communicate using connectionless communications systems. For example, one or more sensors may use a messaging service such as a Short Message System (SMS) cellular or a Multimedia Messaging Service (MMS). Other communications methods may be employed, including routable or bridged networks. In one example or a routable network connection, communication within the sensor network 402 and between a sensor in the sensor network 402 and public or private wide area networks 412 may be based on protocols that establish an end-to-end session used to exchange commands and data. In one example, communications may be facilitated through the use of protocols that establish a contiguous packet-based data connection utilizing a single routable or bridgeable protocol or other session comprised of non-contiguous data connections used to exchange commands and data.

Figure 5:
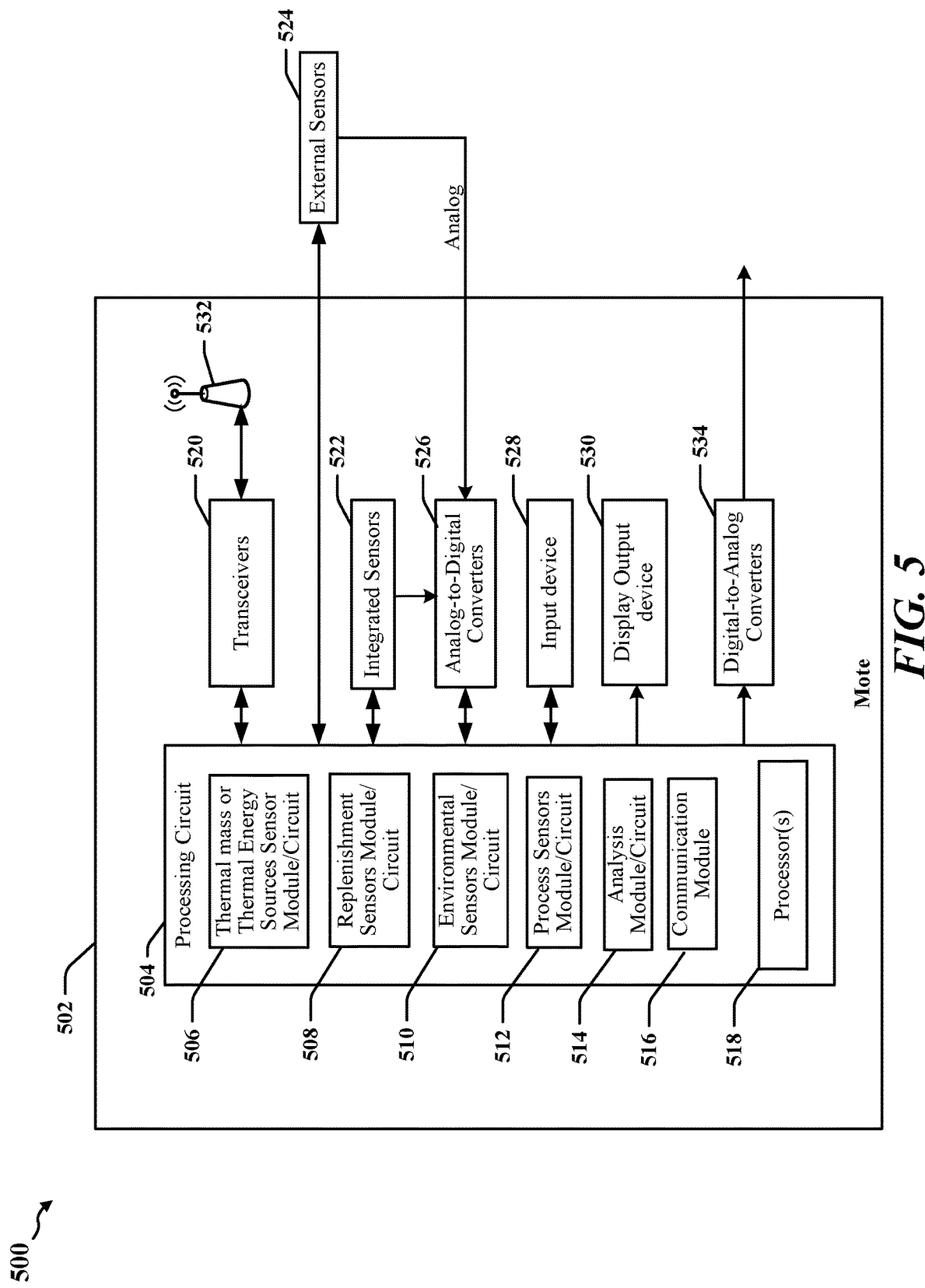
FIG. 5 illustrates a smart sensor according to certain aspects disclosed herein.

FIG. 5 is a block diagram 500 illustrating an example of an architecture for a Mote 502 adapted in accordance with certain aspects disclosed herein. With continued reference to FIGS. 1-4, the Mote 502 may be configured to connect to an aggregator 306 or network 310 by any available means. In one example, the Mote 502 includes a processing circuit 504 that may comprise one or more of a microprocessor, a microcontroller, a digital signal processor (DSP), sequencing logic, a state machine, etc. The Mote 502 and/or processing circuit 504 may include a variety of commonly used devices and components such as non-transitory storage, light emitting diode (LED) lamps, displays or indicators, buttons or switches and/or an audible alarm indicator. The Mote 502 may include one or more transceivers 520 that enable the Mote 502 to communicate directly or through a network that includes sensors, peer devices and/or networked services and servers. In some examples, a transceiver may include radio frequency, optical or infrared transmitters and/or receivers. The Mote 502 may communicate with one or more sensors 522, 524, including sensors 522 that are incorporated in or integrated with the Mote 502 and/or external sensors 524 that may be coupled to the Mote 502 using wired physical connectors and/or wireless communications. The Mote 502 may additionally include or operate as a global positioning system receiver, a display controller 530, and user input controllers or drivers 528 that may interface with devices such as a keypad, touchscreen or the like. The Mote 502 may include one or more digital inputs or analog-to-digital (A/D) converters 526 configured to receive analog inputs from one or more of the sensors 522 and/or 524 for example, and one or more digital-to-analog (D/A) converters 534.

Certain sensors may be provided in an integrated circuit device, on a chip carrier or circuit board that carries the processing circuit 504. The sensors 522, 524 may include transducers that can be used to sense or measure door position, pressure, acceleration, temperature, humidity, magnetic field, light, load, inclination, RFID signals and or RFID return signals, whether related to a passive or active RFID tag. The processing circuit 504 may include a battery or energy scavenging device and a wired, wireless, infrared, or magnetically coupled interface (e.g. transceiver 520) that is coupled to an antenna 532 used for communications.

In accordance with various aspects of the disclosure, an element, or any portion of an element, or any combination of elements as disclosed herein may be implemented using the processing circuit 504. The processing circuit 504 may include one or more processors 518 that are controlled by some combination of hardware and software modules. Processors 518 may include microprocessors, microcontrollers, digital signal processors, state machines or sequencers, and may be implemented in system-on-chip devices, application-specific integrated circuits, field programmable gate arrays, programmable logic devices. Processors 518 may include or be associated with gated logic, discrete hardware circuits, and other suitable hardware configured to perform the various functionality described throughout this disclosure. The processors 518 may include specialized processing sub-circuits that perform specific functions, and that may be configured, augmented or controlled by software modules. The one or more processors 518 may be configured through a combination of software modules loaded during initialization, and may be further configured by loading or unloading one or more software modules during operation.

Certain software modules may be loaded directly from memory contained within 504 or received externally from a remote computer via transceiver and 520 and antenna 532 during initialization of the processing circuit 504, and may configure or update the software in the processing circuit 504 to enable performance of the various functions disclosed herein. For example, one or more software modules 506 may manage, configure and communicate with sensors that monitor the depletion and/or state of thermal mass or thermal energy sources maintained in a reservoir and/or a storage or supply tank, one or more software modules 508 may manage, configure and communicate with sensors 124, 134, 212, 214, 216, 218 220, 224 that monitor quantities that can characterize thermal mass or thermal energy source replenishment events, one or more software modules 510 may manage, configure and communicate with sensors that monitor environmental conditions, one or more software modules 512 may manage, configure and communicate with sensors that monitor processes within the monitored equipment. In other examples, one or more software modules 514 may be provided to perform analysis, aggregation, filtering or otherwise process raw sensor data, and one or more software modules 516 may be deployed to manage communication between the Mote 502 and a network. A control program and/or an operating system may be provided that interacts with interrupt handlers and device drivers, and that controls access to various resources provided by the Mote 502. The resources may include memory, processing time, access to the transceiver 520, a user interface, and so on.

Figure 6:
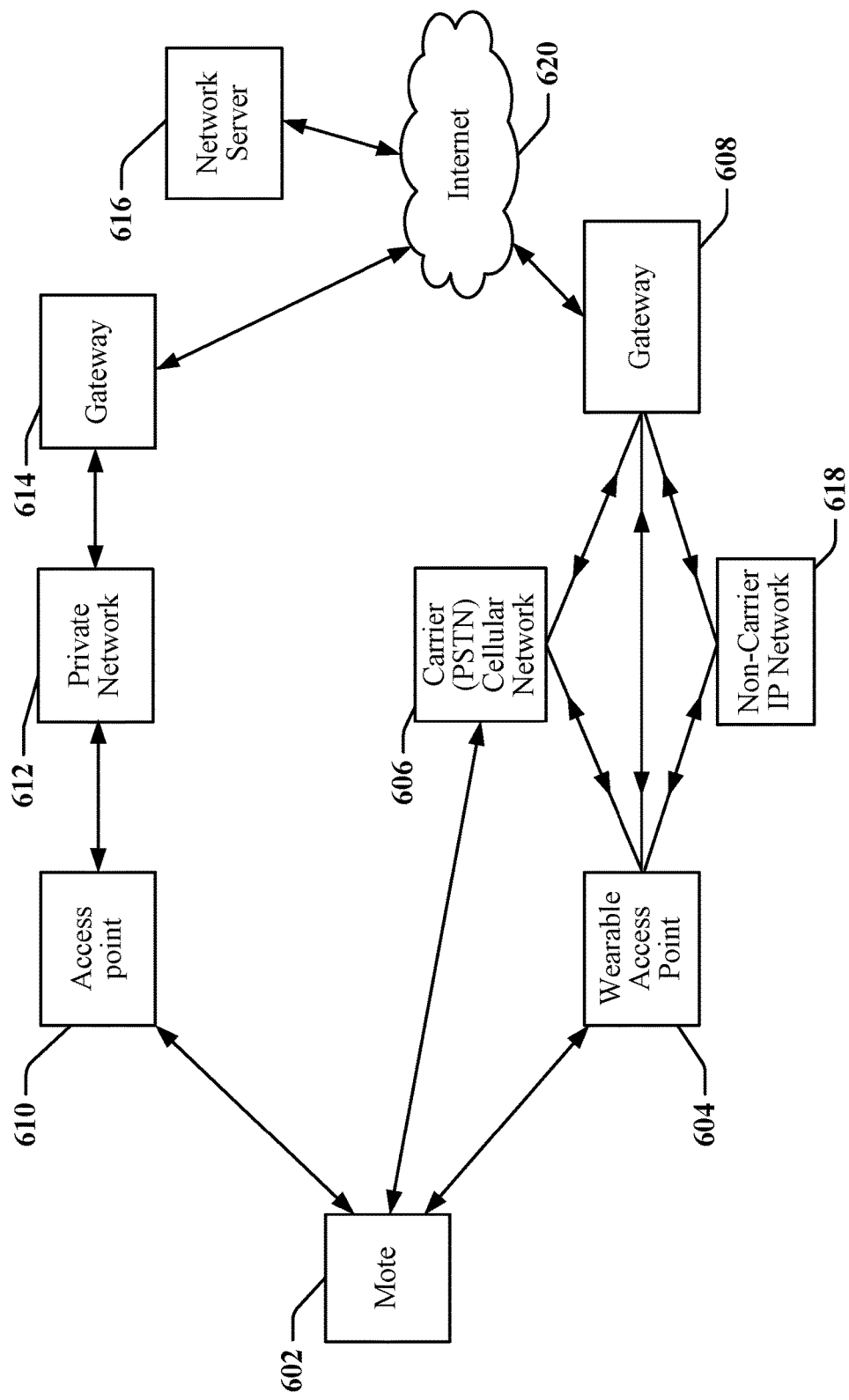
FIG. 6 illustrates a routable network accessed by a smart sensor according to certain aspects disclosed herein.

FIG. 6 illustrates one example of heterogeneous routable network 600. A Mote 602 may exchange data with networked entities 616 using one or more networks 606, 612, 618, 620 that may be accessible through gateways 608, 614. The gateways 608, 614 may provide access to a broad range of network services through a broad range of available network technologies. The gateways 608, 614 may include network access points, base stations, peer devices, bridges and/or routers operable using one or more radio access technologies (RATs), including cellular RATs, WiFi, Bluetooth, and other available RATs. In some instances, one or more gateways 608, 614 may be accessed through a wired connection. The process of information gathering or data harvesting from one or more smart sensors (e.g., Mote 602) may be referred to herein as "data backhaul." Data may be harvested through a private network 612, the Internet 620, a publicly or privately accessible wireless IP network 618, and/or a carrier network 606 that can provide data and public switched telephone network (PSTN) services using some combination of wired and continuous wireless cellular network based on a GPRS, CDMA, 4G LTE, 5G or another suitable RAT. The Mote 602 may include one or more radio frequency (RF) transceivers operable to connect through a wireless access point 610 and/or through a purpose-built data collection agent such as a wearable access point 604 in a conventional or ad hoc network.

In certain embodiments, systems can be packaged for remote deployment by a field service technician assigned to replenish thermal mass or thermal energy sources, for example. Sensor generated information and metadata may be processed at deployed systems in real-time and the results may be stored locally and downloaded for evaluation at a later time, or transmitted periodically through a network for evaluation at a central location. In this manner, results gathered and processed at remotely deployed devices may be aggregated, analyzed and/or reviewed centrally using more powerful analytical tools and drawing on centralized human and machine expertise as required. In some instances, information aggregated from disparate sources and/or multiple operators (federated data) may be used by the analytical tools.

In certain embodiments, information and metadata may be acquired indirectly and included in processing and decision-making. For example, technicians, operators and other persons performing various operations, including resupply, examination, maintenance and/or repair operations related to a refrigeration system may obtain, by means of direct observation, or indirectly by means of ad-hoc connection events with a device such as a Mote 502, information relevant to the operations and/or status of the refrigeration system, and such persons may enter or cause to be entered such information for evaluation. In this manner, results and other information gathered and processed at remotely deployed devices may be collected, aggregated, communicated analyzed and/or reviewed centrally regardless of whether such information is obtained manually or automatically from sensors and other equipment, by human intervention or observation, or otherwise by automated means. Data that is entered manually or automatically may include equipment location and historical replenishment information or qualitative or quantitative data related to configuration, environmental or operating conditions such as room temperature voltage levels measured at one or more points in an electrical circuit, repair information such as observed condition of filter media, air-flow restrictions, repair type codes and cost of repairs for one or more codes. According to certain aspects described herein, raw data can be imported from another system and included in analysis.

Figure 7:
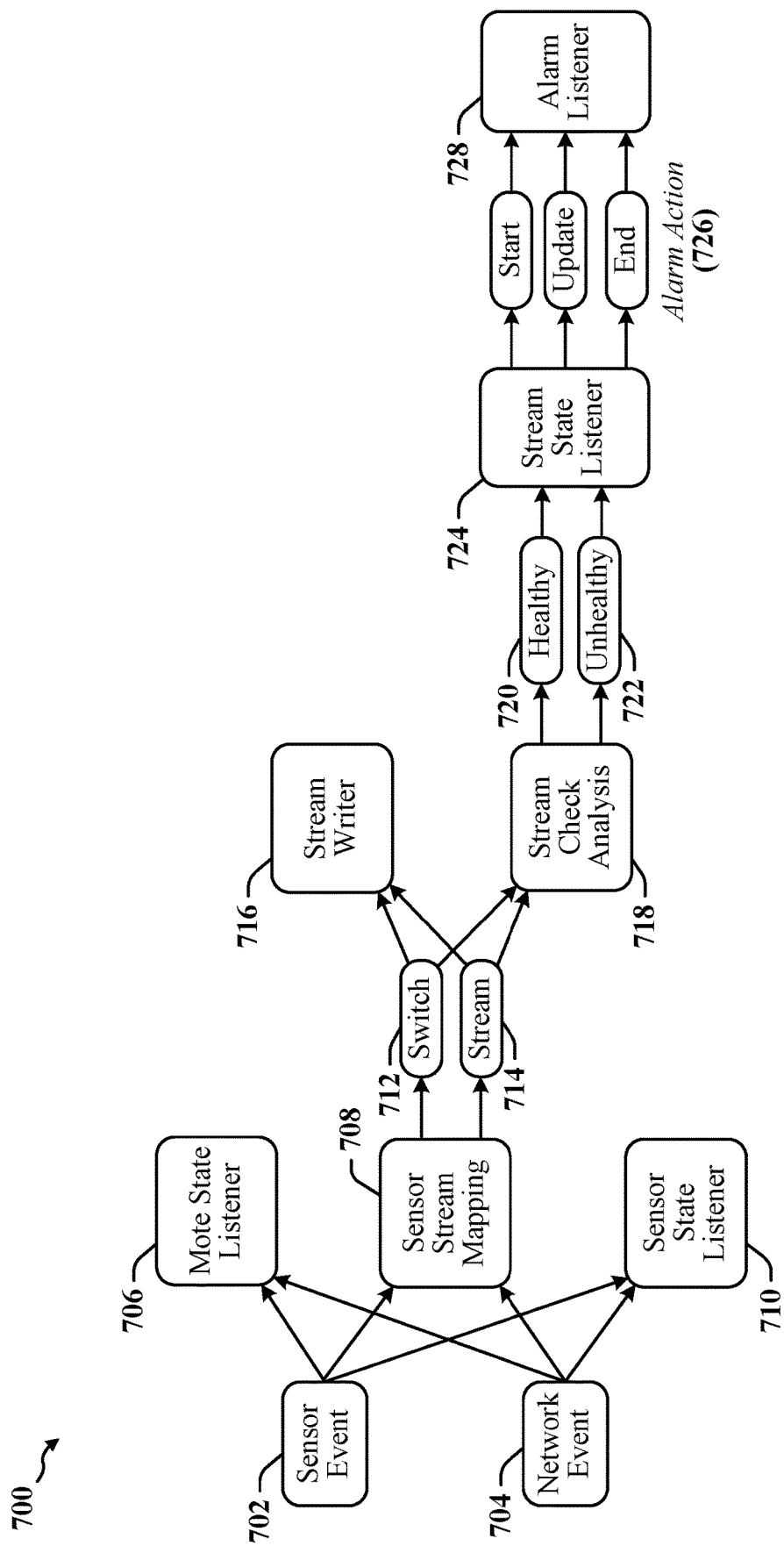
FIG. 7 is a state diagram illustrating a workflow managed by certain aspects disclosed herein.

FIG. 7 is a data flow diagram 700 that demonstrates one example of sensor data acquisition, processing, and analysis.

Various systems and circuits may cooperate in the data flow. The data flow may be initiated by a sensor event 702 that indicates that sensor data is available or a network event 704 that relates to network quality. The sensor event 702 may be generated when one or more Motes 302a-302n, 304a, 304b or aggregators 306 (see FIG. 3) has sensor data for processing. The one or more Motes 302a-302n, 304a, 304b or aggregators 306 may generate the event in a store-and-forward mode of operation, and/or after performing some initial analysis of the sensor data. The network event 704 may relate to network quality metrics, and may indicate a packet error rate, signal strength, signal-to-noise ratio (SNR), association or authentication failures, reboots, signal-to-interference-plus-noise ratio (SINR), or other metric that may indicate that the network connection is unreliable or trending towards unreliability. The network event 704 may require attention to avoid masking issues related to a monitored asset that cannot be timely communicated due to degradation of network connection quality.

In some implementations, a monitoring system and/or elements of a monitoring system may be configured to wake from a sleep state or idle state to service sensors and/or Motes 302a-302n, 304a, 304b. A sampling period may be configured based on application needs, specifications, available battery power in the Mote state listener 706, sensor state listener 710 state network loading, and/or one or more Motes 302a-302n, 304a, 304b. In one example, a Mote state listener 706 and/or a sensor state listener 710 may awake from sleep once a minute to interrogate a Mote 302a-302n, 304a, 304b or a sensor, capture analog and digital sensor data, before returning to the sleep state or idle state. A transmission schedule may be configured. The transmission schedule determines a frequency at which analog and digital sensor data and/or information derived from the analog and digital sensor data is transmitted over a network. In one example, a transmit triggers a transmission periodically, where the period may range between 4-14 minutes, for example. The periodicity may be based on factors including network congestion and available battery power. In various implementations, one or more Motes 302a-302n, 304a, 304b are configured to push sensor data and/or information derived from the sensor data to the network periodically or in response to an alert, event or alarm. The Motes 302a-302n, 304a, 304b may be configured to push information when a facility or campus network prohibits inbound connection that would otherwise enable networked systems to pull information from the Motes 302a-302n, 304a, 304b.

A Mote state listener 706 may be configured to receive and process events 702, 704 and to update the state of an affected Mote 302a-302n, 304a, 304b. A sensor state listener 710 may be provided to receive and process events 702, 704 for sensor related issues, and to update the state of affected sensors. A sensor stream mapping module and/or circuit 708 may receive and process the events 702, 704, and may transform sensor data to obtain a stream meta-object for further processing and analysis. The sensor stream mapper 708 may produce outputs in different formats 712, 714 that may be used to optimize a resupply schedule, schedule a one-off resupply event or initiate and/or update a repair process. A journaling system (Stream Writer) 716 may be configured to store data in one or more formats 712, 714 for later replay.

The outputs of the sensor stream mapper 708 may be provided to an analyzer 718 that updates a monitoring system used for managing and performing diagnostics on sensor data. The analyzer 718 may process sensor data to determine whether a change in status of an asset indicates that an event or other notification should be forwarded based on the detection of an anomalous event. In one example, the analyzer 718 may generate events 720, 722 or other indications related to an asset that may be categorized as healthy state events 720 or unhealthy state events 722. A listener module 724 may monitor such events 720, 722 in order to generate one or more alarm actions 726, including Start Alarm, End Alarm, and/or Update Alarm state. An alarm listener 728 may be used to capture and report alarm state to a user of the system.

Figure 8:
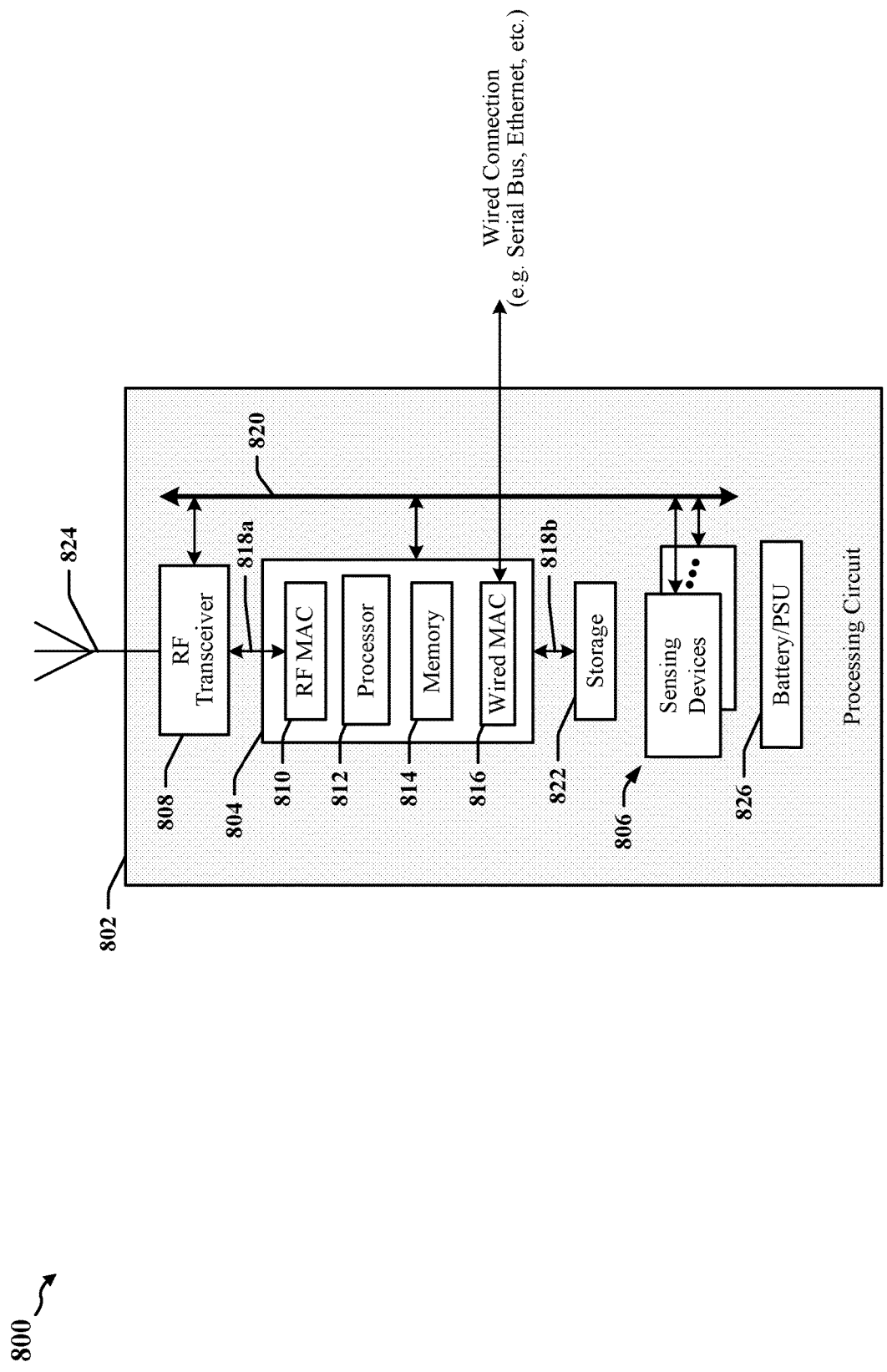
FIG. 8 illustrates one example of an apparatus that may be adapted according to certain aspects disclosed herein.

FIG. 8 depicts an example of an apparatus 800 that may include or manage one or more sensing devices 806. In some implementations, the apparatus may embody or be embodied in a Mote 118, 602. The apparatus 800 may include a processing circuit 802 that has multiple subcomponents or devices 804, 806, 808, 822, 822, 826. In some instances, the processing circuit 802 may be implemented in, or include an application-specific integrated circuit (ASIC) or system-on-chip (SoC) device. In one example, the apparatus 800 may include an RF transceiver 808 that enables the apparatus 800 to communicate through one or more antennas 824 with a radio access network, a core access network, the Internet and/or another network.

In the example illustrated in FIG. 8, the processing circuit 802 includes an ASIC device 804 that has one or more processors 812, and other logic circuits. The processing circuit 802 may be controlled by an operating system and may provide an application programming interface (API) layer that enables the one or more processors 812 to execute software modules residing in a storage device 814, 822 for example. The software modules may include instructions and data. The ASIC device 804 may access its internal memory 814, external storage 822, and/or other storage devices. The storage devices 814, 822 may include read-only memory (ROM) or random-access memory (RAM), electrically erasable programmable ROM (EEPROM), flash cards, or any memory device that can be used in processing systems and computing platforms. The processing circuit 820 may include, or have access to a local database or other parameter storage that can maintain operational parameters and other information used to configure and operate the apparatus 800 and/or the processing circuit 802. The local database may be implemented using registers, a database module, flash memory, magnetic media, EEPROM, optical media, tape, soft or hard disk, or the like.

The processing circuit 802 may communicate through one or more interface circuits such as the RF transceiver 808, which may include a combination of circuits, counters, timers, control logic and other configurable circuits or modules. In one example, the RF transceiver 808 may be configured to operate in accordance with standards-defined communication specifications or protocols. The processing circuit 802 may include or control a battery 826 or power supply or management device.

Various different embodiments of the apparatus 800 are contemplated. The different versions may be optimized for different uses, operating environments and communication facilities available to the deployed apparatus. The apparatus 800 may be configured as a low-function sensor, Mote (smart sensor) and/or a local system manager. Different embodiments of the apparatus 800 may operate according to different power budgets and may have different processing, memory storage and communication capabilities.

In one implementation, the apparatus 800 may be configured as a first type of sensor that is optimized for battery-powered operation. In this example, the processor 812 may be a microcontroller, finite state machine or other low-power processing circuit 804. The processing circuit 804 may be used for low-power, battery-driven operations when limited processing power is needed. In one example, the processing circuit 804 may be configured to monitor one or more sensing devices, manage a sleep or idle cycle for the first type of sensor, receive measurements and other sensor information from the sensing devices, and communicate the measurements and other sensor information through a wired or wireless network. The sleep/idle cycle may be ended by a timer or timing modules in the first type of sensor, or by receipt of a signal received from a local system manager.

The first type of sensor may communicate with a local system manager or may launch information directly on to a wide area network. The first type of sensor may be configured with sufficient information to address a networked server, and may periodically transmit sensor-related information over a network to the network server. In other instances, the first type of sensor may respond to polls and/or queries from a networked sever or a local system manager by transmitting sensor-related information generated by the sensor device. The first type of sensor may communicate using any suitable network or technique. In various examples, the first type of sensor may be coupled to a serial bus, and/or may be configured to communicate over a wired or wireless IP-based network, cellular telephone network, including meshed networks, ad hoc networks and opportunistic networks.

In another implementation, the apparatus 800 may be configured as a second type of sensor that is optimized for battery-powered operation. In this example, the processor 812 may be capable of hosting applications and functions. The second type of sensor may establish and maintain concurrent connections with multiple communication partners. In some instances, the second type of sensor may serve as a local system manager for other sensor devices. The second type of sensor may be battery powered and/or coupled to a power supply. The functionality of the second type of sensor, may be determined by power budget, network latency or network configuration and the nature, structure or configuration of the monitored equipment. The processing circuit 804 of the second type of sensor may be used in a low-power, battery-driven mode when limited processing power is needed, and a high-performance mode as needed and when the power budget permits. In one example, the processing circuit 804 may be configured to monitor one or more sensing devices, manage a sleep or idle cycle for multiple sensors, receive measurements and other sensor information from the monitored or managed sensing devices, and communicate the measurements and other sensor information through a wired or wireless network. In the latter example, the processing circuit may maintain a connection with networked resources and/or establish connections through the network as needed or desired. The sleep/idle, sample and transmit cycles may be managed, configured and optimized to respond to system needs, network latency, available power budget and changing network conditions.

In some implementations, the second type of sensor may communicate with a local system manager or may launch information directly on to a wide area network. The second type of sensor may be configured with sufficient information to address a networked server, and may periodically transmit sensor-related information over a network to the network server. In other instances, the second type of sensor may respond to polls and/or queries from a networked sever or a local system manager by transmitting sensor-related information generated by one or more managed or monitored sensor devices. The second type of sensor may communicate using any suitable network or technique. In various examples, the second type of sensor may be coupled to a serial bus, and/or may be configured to communicate over a wired or wireless IP-based network, cellular telephone network, including meshed networks, ad hoc networks and opportunistic networks.

In certain implementations, the apparatus 800 may serve as a local system manager that manages multiple sensor outputs and inputs. The local system manager may be capable of capturing and aggregating sensor data from multiple sensors, such that the sensor data can be transmitted efficiently to one or more network resources and/or servers. Analytics systems in the network resources and/or servers may identify, analyze and/or interpret patterns in the sensor data. In some instances, the network resources may generate characteristics representative of the operation of monitored equipment and may detect trends or exceptions through comparisons with baseline or benchmark characteristics for the equipment or nominally operating equipment. The trends and/or exceptions may be used to predict issues or failures in the monitored systems, including resupply of thermal mass, refrigerant or phase-change material used by the monitored systems.

Figure 9:
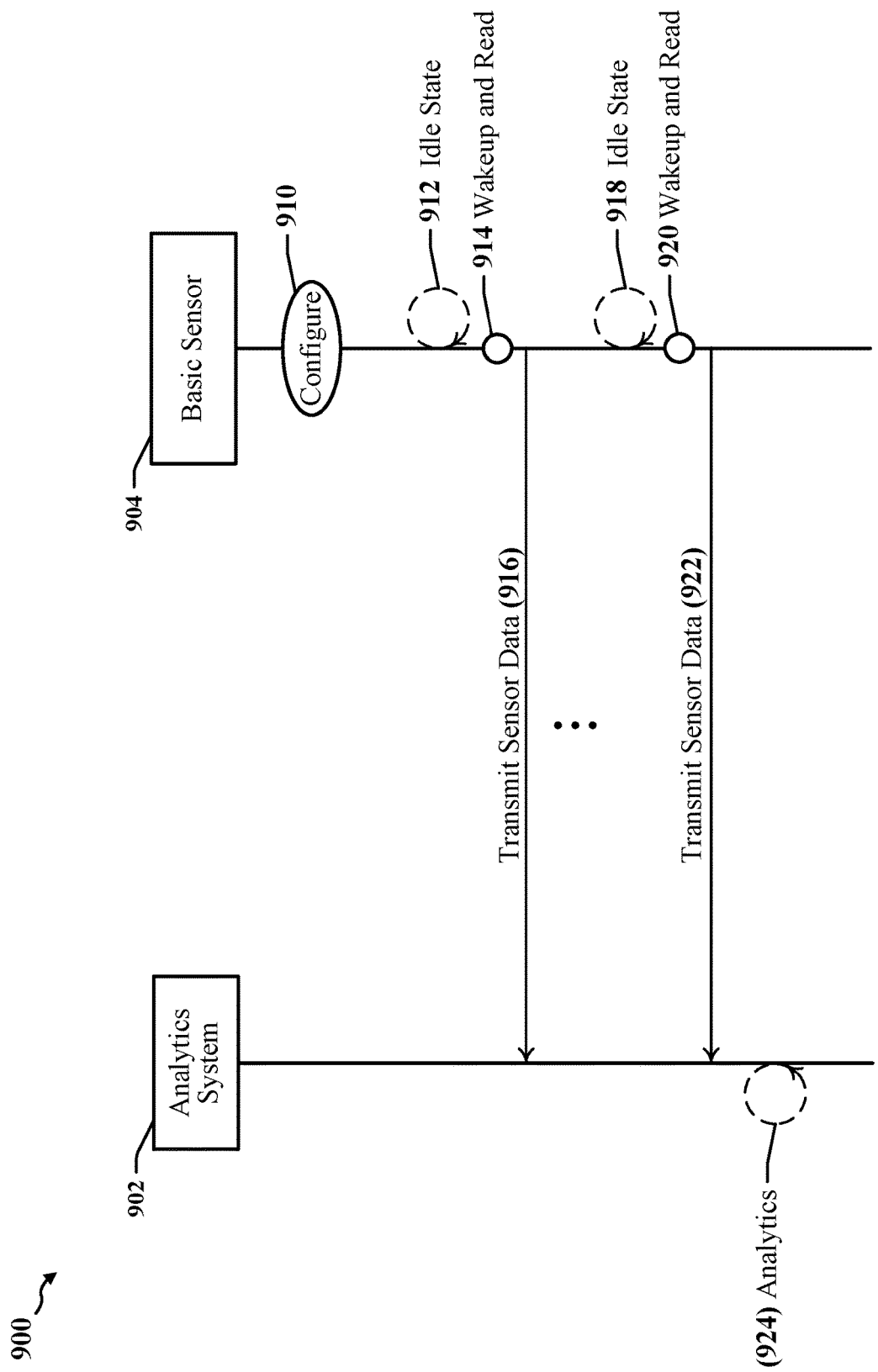
FIG. 9 is a first message flow diagram that illustrates certain aspects disclosed herein.

FIG. 9 is a message flow diagram 900 that illustrates certain aspects of this disclosure. A sensor 904, which may correspond to the first or second type of sensor described above, may operate to collect and relay measurements generated by a sensing device. The sensor 904 may be configured 910 during manufacture, integration and/or installation. In some instances, the sensor may be configured 910 by a management device that is at least temporarily coupled to the sensor 904. The sensor 904 may be configured with information related to communication and idle states 912, 918. In operation, the sensor 904 may enter an idle state 912, 918 between measurement and/or communication events. The duration of the idle state 912, 918 and/or timing of measurement and/or communication events may be provided during configuration 910.

In the illustrated example, the sensor 904 exits the idle state 912, 918 at a prescribed time 914, 920 and causes one or more attached sensing devices to measure a monitored quantity. The sensing device may measure temperature, liquid level, pressure, flow, vapor state, vibration, strain, load, state of an actuator, solenoid or switch (e.g., magnetic contact switch, electric contact switch, reed switch, capacitive contact switch), and so on. The sensor 904 may then transmit 916, 922 sensor data that characterizes the measured quantities to a network server 902 that may, for example provide analytics 924 related to the sensor data and health of the storage system. The transmission of the sensor data may be initiated by the sensor 904. The sensor 904 may reside behind a firewall that prohibits an external device from initiating a poll or query of the sensor 904. In some instances, the sensor transmits the sensor data through a mesh network or connectionless network, whereby the sensor data may be conveyed opportunistically to the destination server. In other instances, the sensor 904 establishes a connection with the destination server when sensor data is available for transmission, or when the sensor 904 has been configured to sample and transmit according to an optimized schedule which maximizes battery life.

Figure 10:
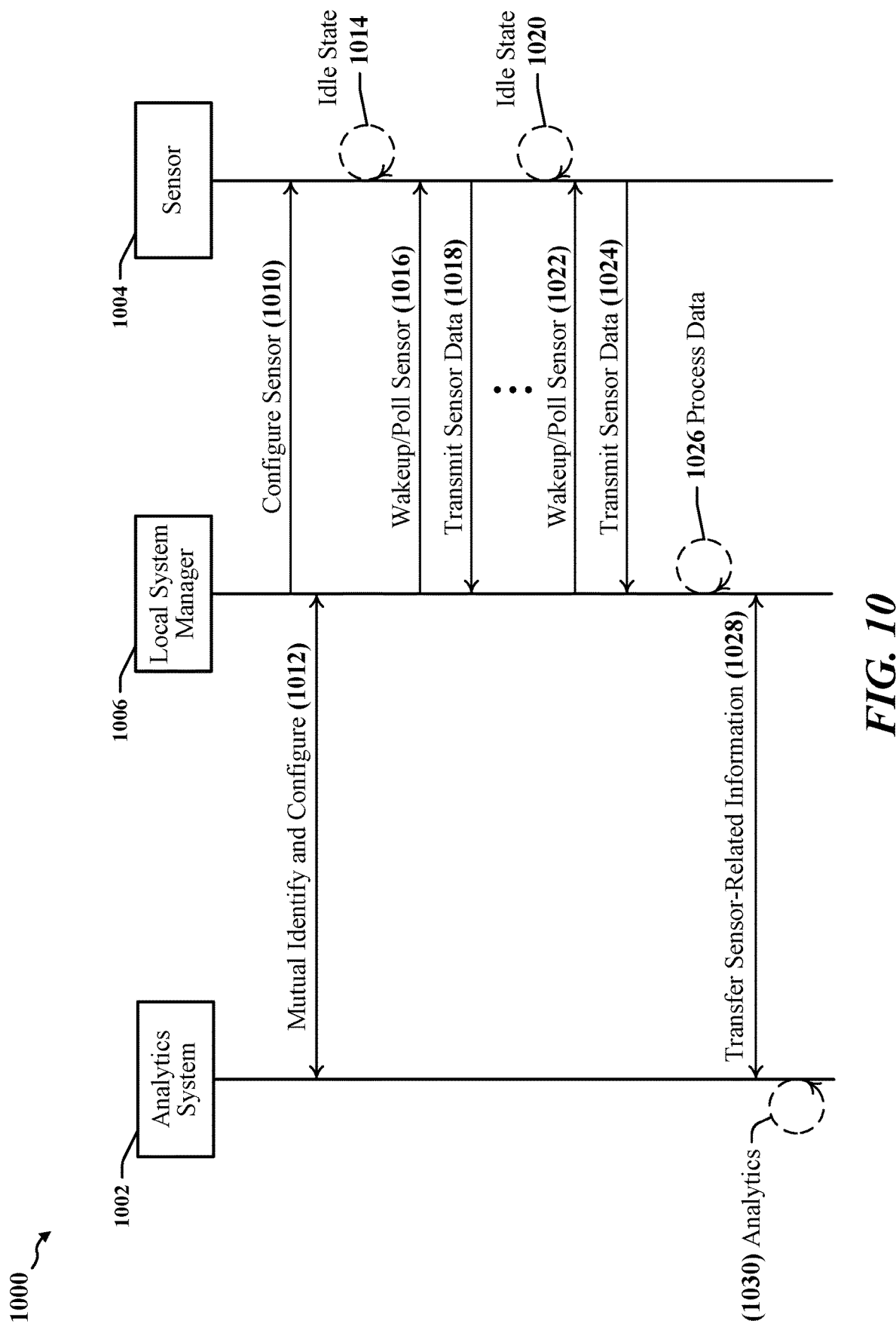
FIG. 10 is a second message flow diagram that illustrates certain aspects disclosed herein.

FIG. 10 is a message flow diagram 1000 that illustrates certain aspects of this disclosure. A sensor 1004, which may be similar in some aspects to the sensor 904 illustrated in FIG. 9 and which may correspond to the first or second type of sensor described above, may operate to collect and relay measurements generated by a sensing device. A local system manager 1006, or Mote, may be configured to service, manage and optimally configure the sensor 1004. The sensor 1004 may be initially configured 1010 during manufacture, integration and/or installation. In some instances, the local system manager 1006 may configure 1010 the sensor from time to time. The sensor 1004 may be configured with information related to communication and idle states 1014, 1020. In operation, the sensor 1004 may enter an idle state 1014, 1020 between measurement and/or communication events. The duration of the idle state 1014, 1020 and/or timing of measurement and/or communication events may be provided during configuration 1010.

In the illustrated example, the local system manager 1006 may establish a connection with a networked server environment, here analytics system 1002, and may exchange configuration and other information 1012, including the configuration of one or more sensors 1004 managed by the local system manager 1006. In operation, the sensor 1004 may be in an idle state 1014, 1020 to conserve power when it receives a communication 1016, 1022 from the local system manager 1006. The communication 1016, 1022 may cause the sensor 1004 to exit the idle state 1014, 1020. In some instances, the sensor 1004 may be configured to exit the idle state 1014, 1020 before the communication 1016, 1022 is received from the local system manager 1006. After exiting the idle state 1014, 1020, the sensor 1004 may cause one or more sensing devices to measure a monitored quantity. The sensing device may measure temperature, liquid level, pressure, flow, vapor state, vibration, strain, load, state of an actuator, stepper motor, solenoid, or switch (e.g., magnetic contact switch, electric contact switch, limit or reed switch, capacitive contact switch), and so on. The sensor 1004 may transmit 1018, 1024 sensor data representative of monitored quantities to the local system manager 1006. The local system manager 1006 may process 1026 sensor data received from the sensor 1004. In some examples, the local system manager 1006 may perform some analytics functions on the sensor data. The analytics functions may be based on trends, patterns and other information generated by the local system manager 1006 and/or received from the analytics system 1002.

The sensor 1004 may transmit 1028 sensor data, processed sensor data and/or analytics derived from the sensor data to the networked server environment. The transmission of the sensor data may be initiated by the sensor 1004, local system manager 1006 or the networked server environment. The transmission of the sensor data may be initiated periodically or in response to an alert or alarm, including alerts and alarms identified by analytics generated by the local system manager 1006 or the networked server environment. In some instances, the sensor 1004 or local system manager 1006 transmits the sensor data through a mesh network or connectionless network, whereby the sensor data may be conveyed opportunistically to the destination server. In other instances, the sensor 1004 establishes a connection with the destination server when sensor data is available for transmission.

In some instances, the local system manager 1006 or sensors 904 or 1004 may generate network traffic analytics that can be used to optimize battery lifetime. Network congestion can cause the local system manager 1006 or the sensors 904 or 1004 to remain awake until data has been transmitted. The local system manager 1006 or the sensor 904 or 1004 may be battery powered in some implementations. Analytics performed in the local system manager 1006 or the sensor 904 1004 may be used to optimize or maximize battery lifetime through a communication profile or configuration based on an evaluation of the latency of the connection between the local system manager 1006 or the sensor 904 or 1004 and the available network access points. Factors that can contribute to latency include delays attributable to association, authentication, domain name service (DNS) and Dynamic Host Configuration Protocol (DHCP) functions. Delays and latencies occurring inside a firewall and between the firewall location of the local system manager 1006 or the sensor 904 or 1004 to the networked server environment are also profiled and analyzed. The analytics may correlate network loading to time of day and may score the connection latency between each access point and the local system manager 1006 or the sensor 904 or 1004 to provide a "Rule File." The Rule File can be used by the local system manager 1006 or the sensor 904 or 1004 to select an access point based providing the lowest latency based on time of day and/or other parameters. The Rule File may be generated by the local system manager 1006, the sensor 904 or 1004 or by the networked server environment and/or the analytics system 1002. The Rule File may be updated when network performance changes are detected including, for example, when new construction or equipment installation occurs, or due to changes of the network configuration or infrastructure.

In some implementations, transmission schedules may be modified based on available payloads, network performance and/or congestion. In one example, analytics derived by the analytics system 1002 and/or the local system manager 1006 or the sensor 904 or 1004 or at the networked server environment may be cause the interval between transmissions to be adjusted for purposes of optimization based on an evaluation of performance of the network as measured by latency, signal strength, packet error rates, noise floor etc., as data is transmitted through the network to a networked server or to a sensor device. The transmit interval may be increased when larger data bundles are to be communicated. In some instances, the local system manager 1006 or the sensor 904 or 1004 may flush any data queued for transmission to the networked server environment when the local system manager 1006 or the sensor 904 or 1004 detects an alarm. The goal of all such evaluations and optimizations is to minimize radio on-time, per byte transmitted. Network optimization can be based on load on the media access control circuits and modules (e.g., MACs 810, 816) in the local system manager 1006 or the sensor 904 or 1004.

Figure 11:
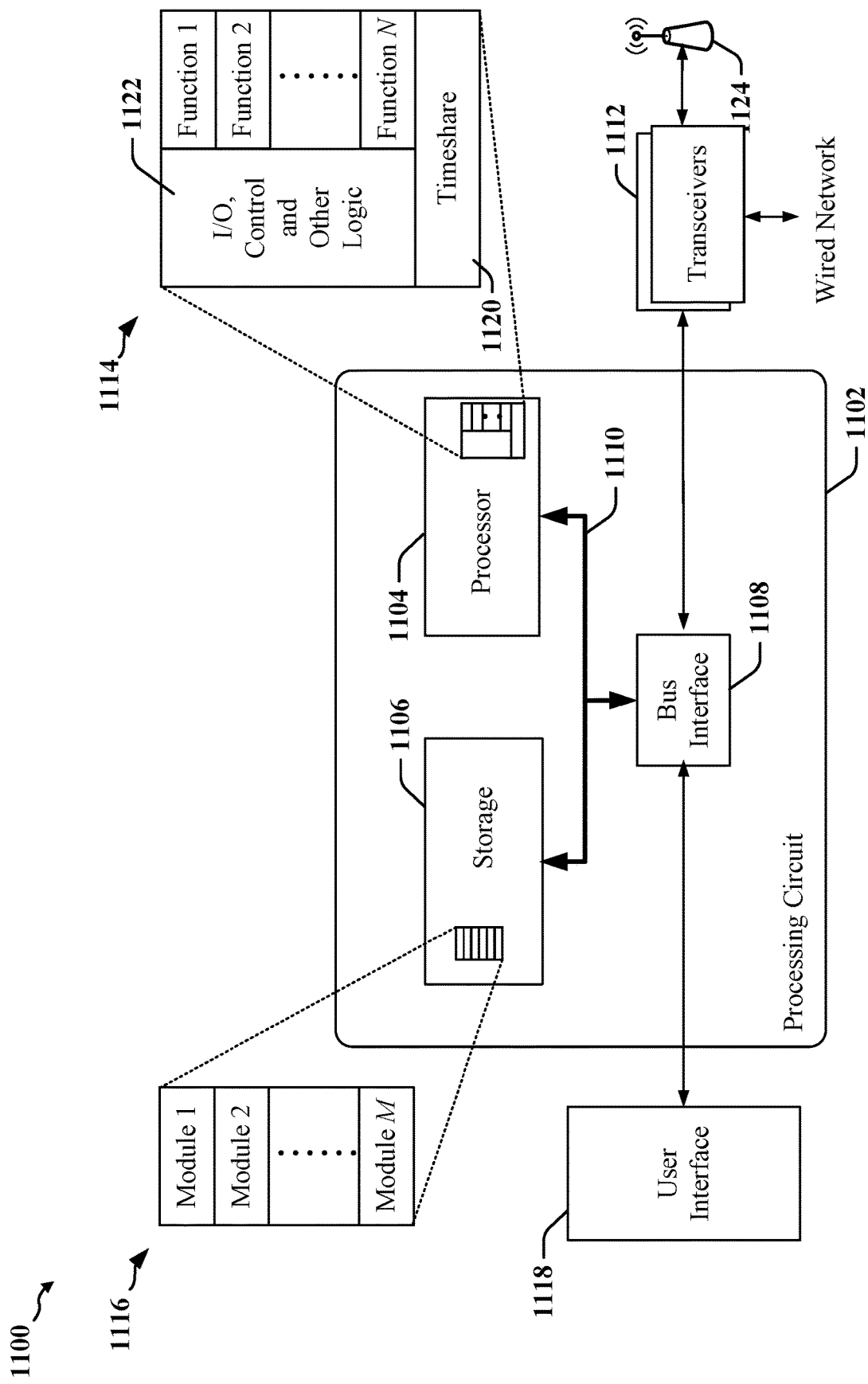
FIG. 11 is a block diagram illustrating an example of an apparatus employing a processing system that may be adapted according to certain aspects disclosed herein.

FIG. 11 is a conceptual diagram 1100 illustrating a simplified example of a hardware implementation for an apparatus employing a processing circuit 1102 that may be configured to perform one or more functions disclosed herein. In accordance with various aspects of the disclosure, an element, or any portion of an element, or any combination of elements as disclosed herein. The processing circuit 1102 may include one or more processors 1104 that are controlled by some combination of hardware and software modules. Examples of processors 1104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. For example, the processing circuit may be configured as communications processors and other processors that are adapted to handle encoding and decoding of data for transmission on one or more wired or wireless networks. The one or more processors 1104 may be configured through a combination of software modules 1116 loaded during initialization, and may be further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media. The bus 1110 may also link various other circuits such as timing sources, timers, peripherals, voltage regulators, and power management circuits. A bus interface 1108 may provide an interface between the bus 1110 and one or more line interface circuits and/or transceivers 1112. A transceiver 1112 may include encoders, decoders, and radio frequency transmitters and receivers that are used in communicating with various other apparatus over a wired or wireless network or over an opportunistic wireless connection, typically through an attached antenna 1124. Depending upon the nature of the apparatus, a user interface 1118 (e.g., keypad, display, speaker, microphone, joystick) may also be provided, and may be communicatively coupled to the bus 1110 directly or through a bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer readable medium. The computer-readable medium and/or storage 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. The computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceivers or wired interfaces 1112, the bus interface 1108, the user interface 1118, timers, mathematical coprocessors, and so on. The software modules 1116 may be updated periodically from a remote server or device via a network connection through 1112 and 1124. The software modules 1116 may include a control program and/or an operating system that interacts with interrupt handlers and device drivers, and that controls access to various resources provided by the processing circuit 1102. The resources may include memory, processing time, access to the transceivers 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceivers 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
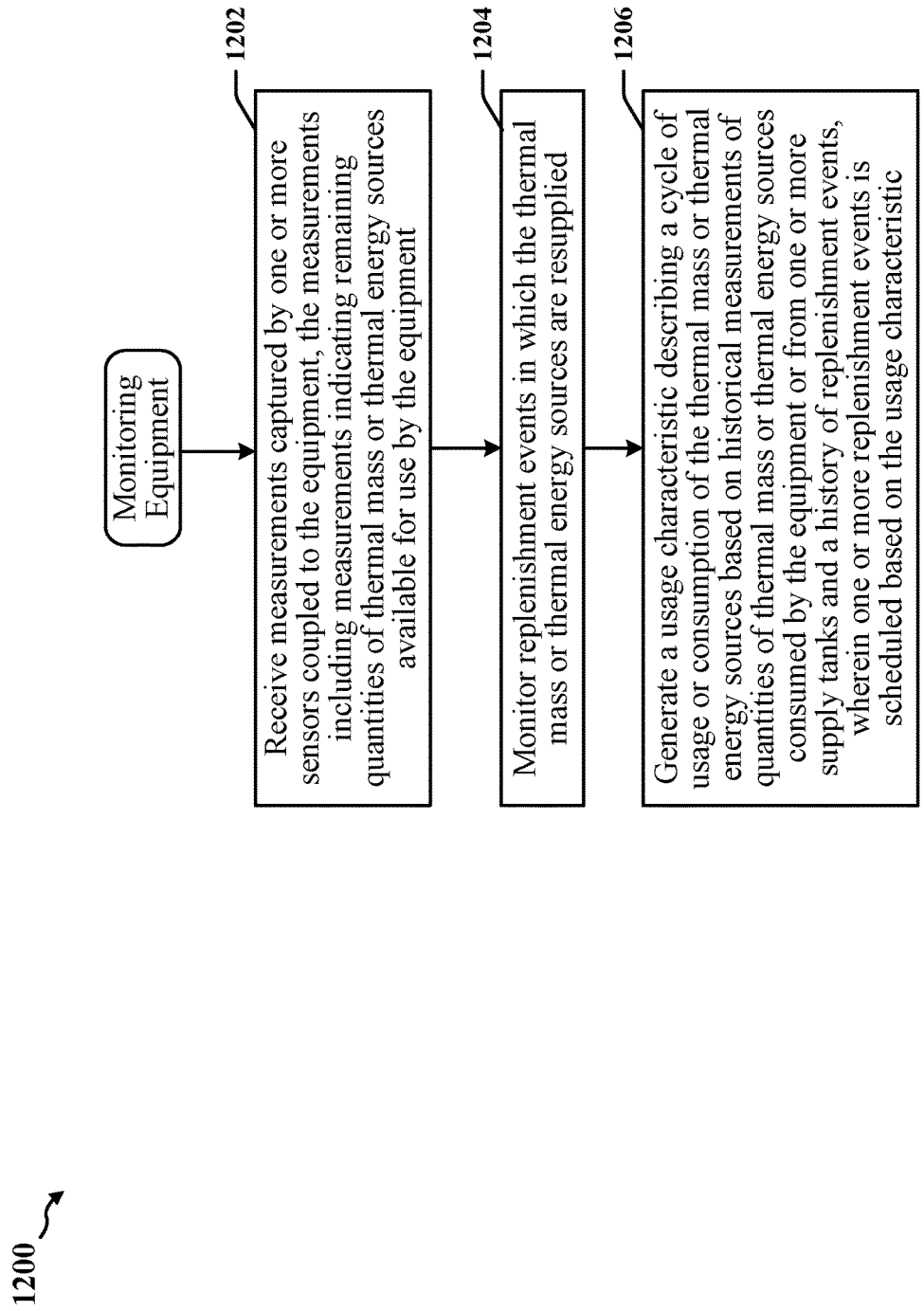
FIG. 12 is a flowchart illustrating a first example of a method of managing the effectiveness and persistence of repairs in refrigeration assets.

FIG. 12 is a flowchart 1200 illustrating an example of a process for monitoring thermal mass or thermal energy sources used by remotely-located equipment in accordance with certain aspects disclosed herein. The remotely-located equipment may include a refrigeration system and the thermal mass or thermal energy sources may include a refrigerant. The remotely-located equipment may be configured to maintain a stable amount or supply of the thermal mass or thermal energy sources and may include a temperature-controlled commodity.

The process begins at block 1202 when a device receives measurements captured by one or more sensors coupled to the equipment. The measurements may include measurements of flow, cycling or weight indicating remaining quantities of the thermal mass or thermal energy sources stored and available for use by the equipment.

At block 1204, the device may monitor replenishment events in which the thermal mass or thermal energy sources are resupplied. The system may monitor an inlet to a tank in the remotely-located equipment. The inlet may be configured to receive a flow of thermal mass or thermal energy sources into the tank. The system may receive sensor data from a sensor coupled to an outlet of a supply system, where the outlet is configured to provide a flow of thermal mass or thermal energy sources into the tank. In some examples, the system may receive information from a temperature sensor to determine fill events as the liquid nitrogen flows through the supply line and where a significant and/or rapid transition in temperature is detected. In one example, the supply line transitions from an ambient temperature to low temperature, where the low temperature can be −196 degrees Celsius or lower. In some examples, the system may receive information from a service person or entity identifying a quantity of the thermal mass or thermal energy source introduced to a tank in the asset during a refill operation monitoring. In the latter examples, the system may correlate the information received from the service person or entity with measurements indicating remaining quantities of thermal mass or thermal energy sources.

At block 1206, the device may generate a usage characteristic describing a cycle of usage of the thermal mass or thermal energy sources based on historical measurements of quantities of thermal mass or thermal energy sources consumed by the equipment or from one or more supply tanks and a history of replenishment events. In some instances, the history of replenishment events may indicate a number of events needed to provide an adequate supply to the equipment. One or more replenishment events may be scheduled based on the usage characteristic. In one example, an additional replenishment event may be scheduled in response to detection of an event, error or other system related exception to nominal operations. In another example, a replenishment schedule of event may be optimized in response to detection of a trend affecting the performance of the monitored equipment.

In certain examples, the one or more sensors comprise a sensor coupled to a tank in the remotely-located equipment. The one or more sensors may include a sensor coupled to an outlet of a tank in the remotely-located equipment, where the outlet is configured to provide a flow of thermal mass or thermal energy sources to be consumed by the remotely-located equipment.

In some instances, an analytics system 1002 may be configured to predict failure of the remotely-located equipment based on the usage characteristic and the determination that the supply of the processes consumable is insufficient due to characteristics of demand. Demand may be evaluated and normalized by such variables as room temperature, door access activity or the delay or interruption of the replenishment of the thermal mass or thermal energy sources to storage tanks servicing the equipment. The system may be configured to identify a loss of efficiency (NER) of the remotely-located equipment based on the usage characteristic. The system may be configured to detect that the performance of the asset has fallen below an optimal level based on a comparison of NER or the usage characteristic with an aggregated characteristic describing NER and or a cycle of usage of the thermal mass or thermal energy sources by a reference to a population of similar remotely-located equipment. The system may be configured to identify a change in operating conditions affecting the remotely-located equipment based on the usage characteristic.

In certain implementations, the sensor data and information related to the replenishment events are received from a remote sensor controller through a routable communications network. A network infrastructure may be provided to couple the remote sensor controller to the routable communications network. The remote sensor controller may be configured to communicate analytical information based on a statistical analysis of measurements of performance of a refrigeration system associated with the at least one smart sensor.

In some examples, the measurements indicating remaining quantities of thermal mass or thermal energy sources include measurements of flow of thermal mass or thermal energy sources from one or more supply tanks. The measurements indicating remaining quantities of thermal mass or thermal energy sources may include measurements provided by sensors which indicate remaining level or quantities of thermal mass or thermal energy sources in a supply tank that are available for use by the equipment.

In certain implementations, monitoring replenishment events includes monitoring an inlet to a tank in the remotely-located equipment, where the inlet is configured to receive a flow of thermal mass or thermal energy sources into the tank. The thermal mass or thermal energy sources may include a refrigerant or phase change material. The thermal mass or thermal energy sources may include a temperature control material.

In certain implementations, monitoring replenishment events includes receiving sensor data from a sensor coupled to an outlet of a supply system. The outlet may be configured to provide a flow of thermal mass or thermal energy sources into a tank in the remotely-located equipment.

In certain implementations, monitoring replenishment events includes receiving information from a service entity identifying a quantity of the thermal mass or thermal energy source introduced to a tank in the remotely-located equipment during a refill operation. Monitoring replenishment events may include correlating the information received from the service entity with measurements indicating remaining quantities of thermal mass or thermal energy sources in the equipment or supply tank servicing the equipment. Monitoring replenishment events may include correlating the information received from the service entity with measurements indicating cycles of supply events.

In certain implementations, the one or more sensors include a sensor coupled to a tank in the remotely-located equipment. The one or more sensors may include a sensor coupled to an outlet of a tank in the remotely-located equipment, where the outlet is configured to provide a measurement of fill events or flow of thermal mass or thermal energy sources to be consumed by the remotely-located equipment.

In certain implementations, the analytics system 1002 may predict insufficiency or failure of supply of thermal mass or thermal energy sources to remotely-located equipment based on the usage characteristic. In some instances, the system may identify an error condition when a resupply event occurs after a supply tank or storage tank is deemed to be exhausted of a refrigerant source. In certain implementations, the system may identify a loss of efficiency of the remotely-located equipment based on the usage characteristic.

In certain implementations, the system may apply a usage characteristic or performance score to the remotely-located equipment indicating that operating performance has fallen below a nominal, achievable or optimal level of performance based on a comparison of the usage characteristic or score with an aggregated characteristic describing a cycle of usage of the thermal mass or thermal energy sources by a reference population of similar remotely-located equipment. The system may identify a change in operating conditions affecting the remotely-located equipment based on the usage characteristic or the performance score.

In certain implementations, sensor data or information related to the replenishment events are received from a remote sensor controller through a routable communications network. Certain analytics-related information may be generated by the remote sensor controller. The remote sensor controller may be configured to communicate analytical information and calculate scores based on a statistical analysis of measurements of performance of a refrigeration system associated with the one or more sensors.

In some instances, some portions or all of the methods disclosed herein are performed by the remote sensor controller. The remote sensor controller may generate a network characteristic describing patterns of network interface usage by a media access control circuit of the remote sensor controller, and schedule one or more transmissions involving the media access control circuit based on the network characteristic.

In certain implementations, the system may identify evidence of insulation damage based on an increased demand for resupply of the thermal mass or thermal energy sources in comparison to corresponding resupply demand in nominally operating peer equipment. The potentially damaged insulation may be associated or attached to a tank in the remotely-located equipment including, for example, a storage or supply tank. In some instances, the increased demand for resupply of the thermal mass or thermal energy sources in comparison to corresponding resupply demand in nominally operating peer equipment may identify a "door open" event.

Figure 13:
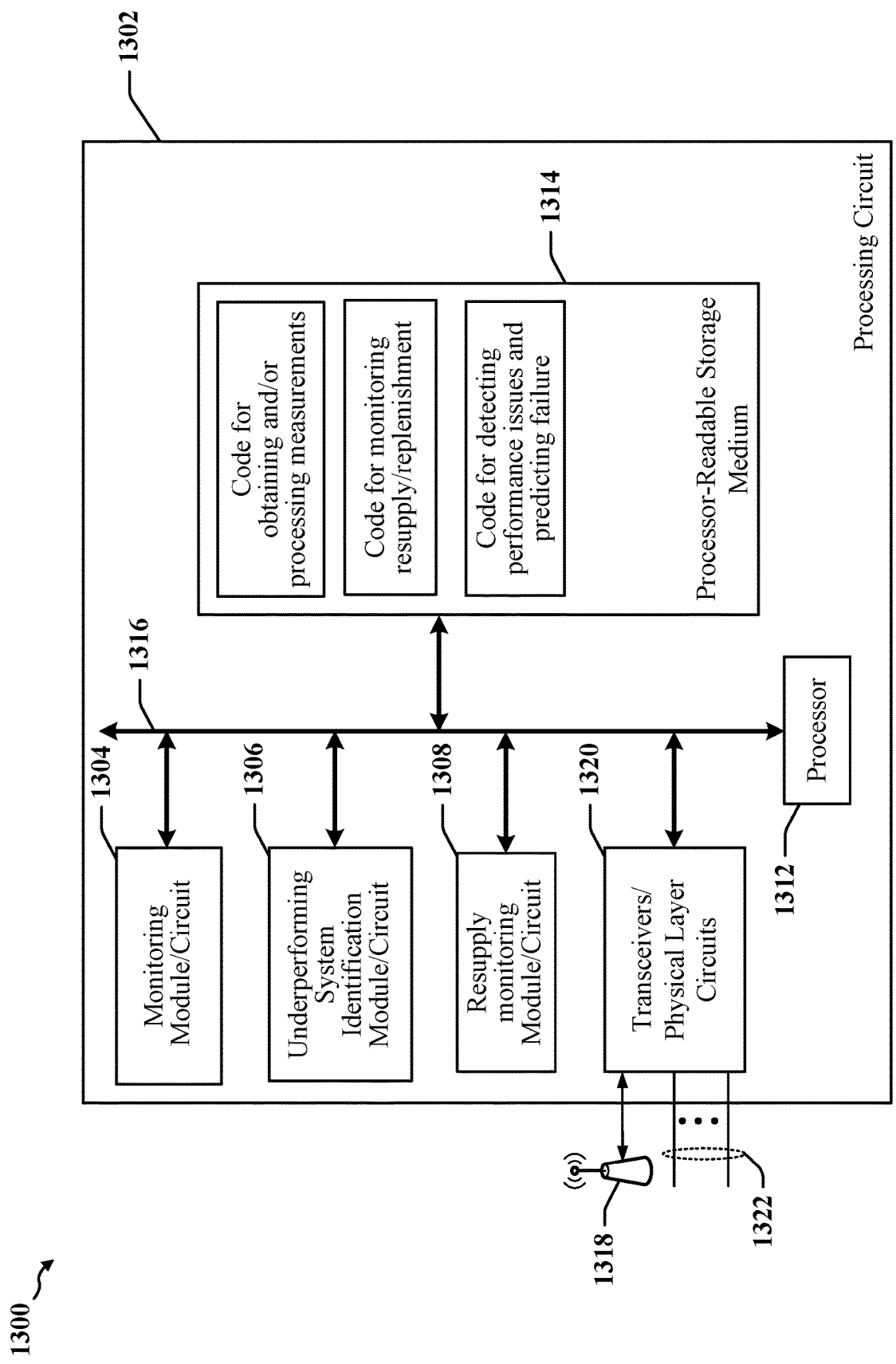
FIG. 13 is a diagram illustrating an example of a hardware implementation for an apparatus adapted to manage the effectiveness and persistence of repairs in refrigeration assets.

FIG. 13 is a conceptual diagram illustrating an example of a hardware implementation for an apparatus 1300 employing a processing circuit 1302. In this example, the processing circuit 1302 may be implemented with a bus architecture, represented generally by the bus 1316. The bus 1316 may include any number of interconnecting buses and bridges depending on the specific application of the processing circuit 1302 and the overall design constraints. The bus 1316 links together various circuits including one or more processors, represented generally by the processor 1312, and computer-readable media, represented generally by the processor-readable storage medium 1314. One or more timers may be connected to the bus and/or may be directly accessible or embodied in a processor 1312. The bus 1316 may also link various other circuits such as timing sources, timers, peripherals, voltage regulators, and power management circuits. One or more transceivers 1320 may provide physical layer circuits to support wired communications through a wired interface 1322, and/or wireless communications through the operation of at least one antenna 1318. Depending upon the nature of the apparatus, a user interface may be provided to support devices such as a keypad, a display, a speaker, a microphone, a joystick, and the like.

The processor 1312 is responsible for managing the bus 1316 and general processing, including the execution of software stored on the processor-readable storage medium 1314. The software, when executed by the processor 1312, causes the processing circuit 1302 to perform the various functions described supra for any particular apparatus. The processor-readable storage medium 1314 may be used for storing data that is manipulated by the processor 1312 when executing software. The processor-readable storage medium 1314 may also be used for storing system information related to one or more remotely managed devices (e.g. profiles), and the apparatus 1300 itself.

In one configuration, the processing circuit 1302 may perform one or more functions in a system configured to monitor levels of thermal mass or thermal energy sources in remotely-located equipment. The processing circuit 1302 may include a module or circuit 1304 configured to receive measurements captured at the remotely-located equipment, a module or circuit 1306 configured to determine whether the remotely-located equipment is performing below an optimal level, a module or circuit 1308 configured to schedule or reschedule resupply of the remotely-located equipment.

In one example, the apparatus 1300 has a radio frequency interface circuit and a processor. The processor may be configured to receive measurements captured by one or more sensors coupled to the equipment, the measurements including measurements indicating remaining quantities of thermal mass or thermal energy sources available to the equipment. The processor may be configured to monitor replenishment events in which the thermal mass or thermal energy sources are resupplied, and generate a usage characteristic describing a cycle of usage or consumption of the thermal mass or thermal energy sources based on historical measurements of quantities of thermal mass or thermal energy sources stored in the equipment or in one or more supply tanks and a history of replenishment events. One or more replenishment events may be scheduled based on the usage characteristic.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The word "exemplary" as used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A system, comprising:
   a plurality of sensors associated with a temperature-controlled storage apparatus;
   a remote sensor controller communicatively coupled to the plurality of sensors; and
   a processor configured to:
   receive first measurements captured by one or more of the plurality of sensors and communicated through the remote sensor controller, the first measurements including measurements indicating remaining quantities of a phase change material used to control temperature within a chamber of the temperature-controlled storage apparatus;
   determine depletion rates and changes in depletion rates of a thermal mass using the first measurements;
   receive second measurements captured by at least one other sensor and communicated through the remote sensor controller, the second measurements relating to amounts and periodicity of resupply of the phase change material during replenishment events;
   generate a usage characteristic representing a cycle of usage or consumption of the phase change material by the temperature-controlled storage apparatus, wherein the usage characteristic is generated using the first measurements and the second measurements normalized for factors including movement or vibration; and
   generate an alarm when deviations of the usage characteristic from a corresponding baseline characteristic are predictive of failure or loss of efficiency of one of the temperature-controlled storage apparatus due to insufficiency of phase change material,
   wherein the system is configured to increase supply of the phase change material using a manifold that is configured to couple multiple sources of the phase change material to the temperature-controlled storage apparatus when a determined rate of depletion is expected to affect operation, health or integrity of the temperature-controlled storage apparatus.

2. The system of claim 1, wherein the second measurements include measurements of flow of thermal mass or thermal energy source from one or more supply tanks located at the temperature-controlled storage apparatus.

3. The system of claim 1, wherein the first measurements include measurements provided by one or more sensors that indicate weight of remaining level of thermal mass or thermal energy source in at least one supply tank that is available for use by the temperature-controlled storage apparatus.

4. The system of claim 1, wherein a first sensor of the plurality of sensors is configured to monitor an inlet to a tank in the temperature-controlled storage apparatus, the inlet being configured to receive a flow of thermal mass or thermal energy source into the tank.

5. The system of claim 1, wherein a first sensor at the temperature-controlled storage apparatus is coupled to a conduit or manifold of a supply system, the conduit or manifold being configured to provide a flow of thermal mass or thermal energy source to a tank in the temperature-controlled storage apparatus.

6. The system of claim 1, further comprising a networked server configured to:
   use the second measurements to determine a number of replenishment events needed to provide an adequate supply of thermal mass or thermal energy source to the temperature-controlled storage apparatus.

7. The system of claim 6, wherein the networked server is further configured to:
   receive information from a service entity identifying a quantity of the thermal mass or thermal energy source introduced to a tank in the temperature-controlled storage apparatus during a refill operation; and
   correlate the information received from the service entity with the first measurements or the second measurements.

8. The system of claim 6, wherein the networked server is further configured to:
   identify an error condition when a resupply event occurs after at least one supply tank or storage tank is deemed to be exhausted of a refrigerant.

9. The system of claim 1, further comprising a networked server configured to:
use statistical, frequency or pattern analysis of the first measurements and the second measurements to identify one or more deviations of the usage characteristic from the baseline characteristic.

10. The system of claim 9, further comprising a networked server configured to:
predict insufficiency or failure of supply of thermal mass or thermal energy source at the temperature-controlled storage apparatus based on the one or more deviations of the usage characteristic from the baseline characteristic.

11. The system of claim 9, wherein the networked server is further configured to:
identify a loss of efficiency of the temperature-controlled storage apparatus based on the one or more deviations of the usage characteristic from the baseline characteristic.

12. The system of claim 1, further comprising a networked server configured to:
apply a performance score to each of the temperature-controlled storage apparatus indicating whether operating performance has fallen below a nominal, achievable or optimal level of performance based on a comparison of the corresponding usage characteristic with an aggregated characteristic describing a cycle of usage of the thermal mass or thermal energy source by a reference population of similar temperature-controlled storage apparatuses.

13. The system of claim 1, wherein the temperature-controlled storage apparatus has one or more sensors coupled to an outlet of a collocated tank that are configured to provide measurements associated with fill events or measurements indicating flow of thermal mass or thermal energy source to be consumed by the temperature-controlled storage apparatus.

14. The system of claim 1, wherein the remote sensor controller is configured to:
calculate scores based on a statistical analysis of measurements of performance of the temperature-controlled storage apparatus provided by the plurality of sensors; and
communicate the scores to one or more networked server.

15. The system of claim 14, wherein the scores are calculated based on a trend analysis of a performance characteristic generated using information previously obtained from the plurality of sensors.

16. The system of claim 1, wherein the remote sensor controller is configured to:
generate analytics information scores using a statistical analysis of measurements provided by the plurality of sensors; and
communicate the analytics information to one or more networked server.

17. The system of claim 1, wherein the remote sensor controller is configured to:
identify evidence of insulation damage at the temperature-controlled storage apparatus based on an increased demand by the temperature-controlled storage apparatus for resupply of the thermal mass or thermal energy source in comparison to corresponding resupply demand in nominally operating peer equipment.

18. The system of claim 1, further comprising a networked server configured to:
identify evidence of insulation damage at the temperature-controlled storage apparatus based on an increased demand by the temperature-controlled storage apparatus for resupply of the thermal mass or thermal energy source in comparison to corresponding resupply demand in nominally operating peer equipment.

19. The system of claim 1, wherein the thermal mass includes a temperature control material.

20. The system of claim 1, wherein the thermal mass includes a refrigerant.

* * * * *